United States Patent
Lim et al.

(10) Patent No.: US 9,568,774 B1
(45) Date of Patent: Feb. 14, 2017

(54) LIQUID CRYSTAL COMPOSITION AND METHOD FOR MANUFACTURING LIQUID CRYSTAL DISPLAY APPARATUS INCLUDING THE SAME

(71) Applicant: Samsung Display Co., Ltd., Yongin-Si, Gyeonggi-Do (KR)

(72) Inventors: Ho Lim, Suwon-si (KR); Hyunku Ahn, Hwaseong-si (KR); Gihoon Yang, Ansan-si (KR); Jiphyo Hong, Pyeongtaek-si (KR)

(73) Assignee: SAMSUNG DISPLAY CO., LTD, Gyeonggi-do (KR)

( * ) Notice: Subject to any disclaimer, the term of this patent is extended or adjusted under 35 U.S.C. 154(b) by 0 days.

(21) Appl. No.: 15/146,334

(22) Filed: May 4, 2016

(30) Foreign Application Priority Data

Oct. 22, 2015  (KR) ........................ 10-2015-0147508

(51) Int. Cl.
| | |
|---|---|
| *G02F 1/1335* | (2006.01) |
| *G02F 1/1337* | (2006.01) |
| *C09K 19/56* | (2006.01) |
| *G02F 1/1341* | (2006.01) |
| *G02F 1/1339* | (2006.01) |

(52) U.S. Cl.
CPC ............ *G02F 1/13378* (2013.01); *C09K 19/56* (2013.01); *G02F 1/1339* (2013.01); *G02F 1/1341* (2013.01)

(58) Field of Classification Search
CPC .............. G02F 1/1339; G02F 1/133345; G02F 1/133723; G02F 2001/13415; G02F 1/133305; G02F 1/133351
See application file for complete search history.

(56) References Cited

U.S. PATENT DOCUMENTS

2014/0240653 A1    8/2014  Lee et al.

FOREIGN PATENT DOCUMENTS

KR        101540139        7/2015

*Primary Examiner* — Tracie Y Green
(74) *Attorney, Agent, or Firm* — Cantor Colburn LLP

(57) ABSTRACT

A method for manufacturing a liquid crystal display apparatus including providing a liquid crystal composition between a first substrate and a second substrate facing the first substrate, the liquid crystal composition including liquid crystal molecules, a thermal initiator, and a reactive monomer; applying heat to the liquid crystal composition to form alignment inducing patterns; forming an electric field between the first substrate and the second substrate; and providing first ultraviolet rays to the liquid crystal composition.

20 Claims, 8 Drawing Sheets

LIQUID CRYSTAL COMPOSITION AND METHOD FOR MANUFACTURING LIQUID CRYSTAL DISPLAY APPARATUS INCLUDING THE SAME

This application claims priority to Korean Patent Application No 10-2015-0147508, filed on Oct. 22, 2015, and all of the benefits accruing therefrom under 35 U.S.C. §119, the content of which in its entirety is herein incorporated by reference.

BACKGROUND (1) Field

The present disclosure relates to a liquid crystal composition including a reactive monomer and to a method for manufacturing a liquid crystal display apparatus including the liquid crystal composition.

(2) Description of the Related Art

Generally, liquid crystal display devices are classified as a twisted nematic mode liquid crystal display apparatus, an in-plane switching mode liquid crystal display apparatus, or a vertical alignment mode liquid crystal display apparatus. In the vertical alignment mode liquid crystal display apparatus, liquid crystal molecules are aligned in a certain direction, and the longitudinal axes of the liquid crystal molecules are vertically aligned with respect to a substrate when an electric field is not applied. Thus, the vertical alignment mode liquid crystal display apparatus generally has a wide viewing angle and a large contrast ratio.

In order to align liquid crystal molecules in a certain direction, a rubbing method or a photo-aligning method have been used. In a vertical alignment mode liquid crystal display apparatus, improved methods of aligning the liquid crystal molecules in a certain direction are desired.

SUMMARY

The present disclosure provides a method for manufacturing a liquid crystal display apparatus, in which the pretilt angle of liquid crystal molecules may be effectively generated, and by which productivity may be improved.

An embodiment provides a method for manufacturing a liquid crystal display apparatus including providing a liquid crystal composition between a first substrate and a second substrate facing the first substrate, the liquid crystal composition including liquid crystal molecules, a thermal initiator, and a reactive monomer; applying heat to the liquid crystal composition to form an alignment inducing pattern on the first substrate and on the second substrate; forming an electric field between the first substrate and the second substrate; and providing first ultraviolet rays to the liquid crystal composition.

In an embodiment, the forming of the electric field and the providing of the first ultraviolet rays may be conducted during a same process In an embodiment, the method may further include providing a sealing layer between the first substrate and the second substrate; and applying heat to the sealing layer. In this case, the providing of the heat to the liquid crystal composition, and the applying of the heat to the sealing layer may be conducted during a same process.

In an embodiment, the method may further include providing second ultraviolet rays to the liquid crystal composition after providing the first ultraviolet rays.

In an embodiment, the first ultraviolet rays and the second ultraviolet rays may have a wavelength in a same region.

In an embodiment, the thermal initiator may be at least one of an azo compound, a peroxy ester compound, a peroxy dicarbonate compound, an acyl peroxide compound, or a redox initiator.

In an embodiment, the thermal initiator may be at least one of tert-amyl peroxybenzoate, 4,4'-azobis(4-cyanopentanoic acid), 1,1'-azobis(cyanocyclohexane), azobisisbutyronitrile (AIBN), 2,2-bis(tert-butylperoxy)butane, 1,1-bis(tert-butylperoxy)cyclohexane, benzoyl peroxide (BPO), 2,5-bis(tert-butylperoxy)-2,5-dimethylhexane, bis[1-(tert-butylperoxy)-1-methylethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, or potassium peroxodisulfate.

In an embodiment, the reactive monomer may include a polymerization reaction group which polymerizes upon initiation by the thermal initiator, and a vertical alignment inducing group which aligns the liquid crystal molecules. In an embodiment, the polymerization reaction group may be at least one of

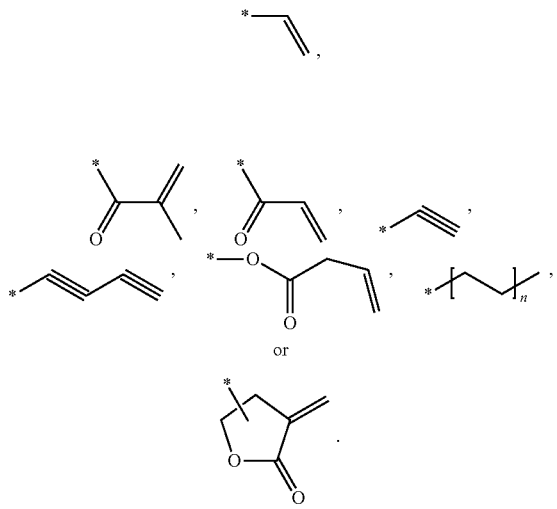

In an embodiment, the reactive monomer may include at least one of an acrylate compound, a methacrylate compound, an epoxy compound, an oxetane compound, a vinylether compound, or a styrene compound.

In an embodiment, the alignment inducing patterns may have a bump shape extruded on the first substrate or on the second substrate.

In an embodiment, a liquid crystal composition includes liquid crystal molecules, a thermal initiator, and a reactive monomer having a polymerization reaction group capable of being polymerized upon initiation by the thermal initiator.

In an embodiment, the reactive monomer may be present in an amount of about 1.0 part by weight to about 1.5 parts by weight per 100 parts by weight of the liquid crystal molecules.

In an embodiment, the thermal initiator may be present in an amount of about 1.0 part by weight to about 3.0 parts by weight per 100 parts by weight of the reactive monomer.

In an embodiment, the thermal initiator may be at least of tert-amyl peroxybenzoate, 4,4'-azobis(4-cyanopentanoic acid), 1,1'-azobis(cyanocyclohexane), azobisisbutyronitrile (AIBN), 2,2-bis(tert-butylperoxy)butane, 1,1-bis(tert-butylperoxy)cyclohexane, benzoyl peroxide (BPO), 2,5-bis(tert-butylperoxy)-2,5-dimethylhexane, bis[1-(tert-butylperoxy)-1-methylethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, or potassium peroxodisulfate.

In an embodiment, the reactive monomer may be a compound represented by following Formula 1.

[Formula 1]

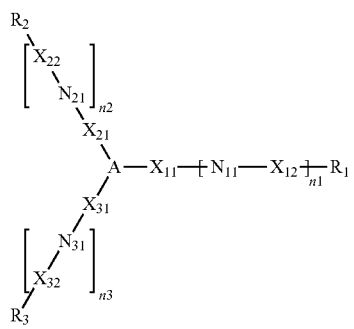

wherein A is a group in Formula 1a:

[Formula 1a]

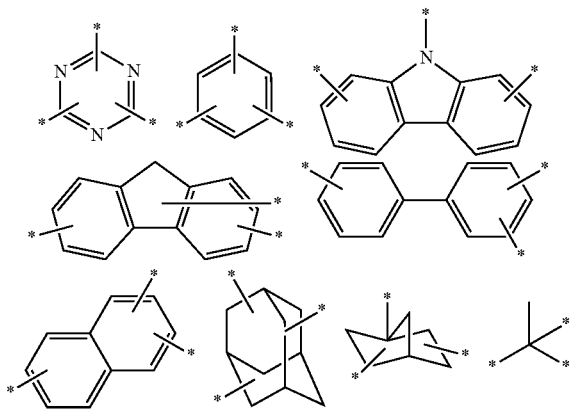

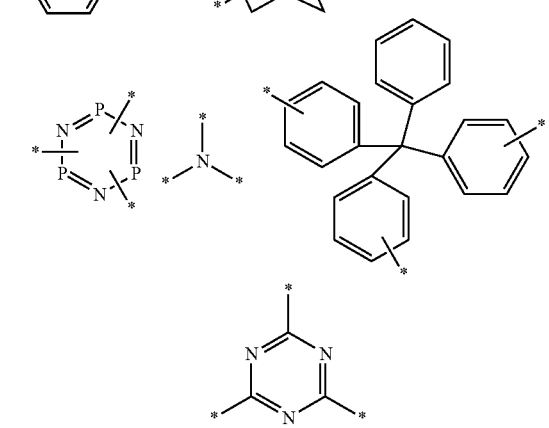

$X_{11}$, $X_{12}$, $X_{22}$, and $X_{32}$ are each independently a direct bond, —O—, —COO—, or —NH—, $N_{11}$ to $N_{31}$ are each independently a group in Formula 1b:

[Formula 1b]

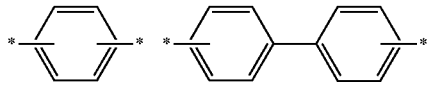

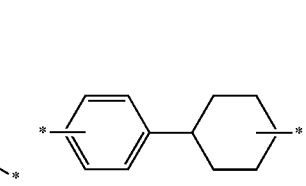

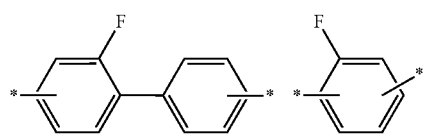

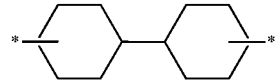

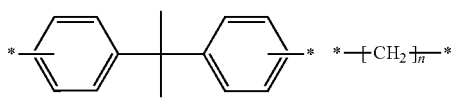

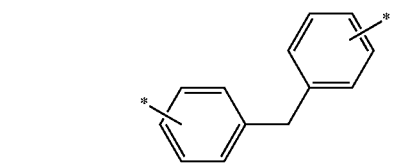

$R_1$ to $R_3$ are each independently a group in Formula 1c:

[Formula 1c]

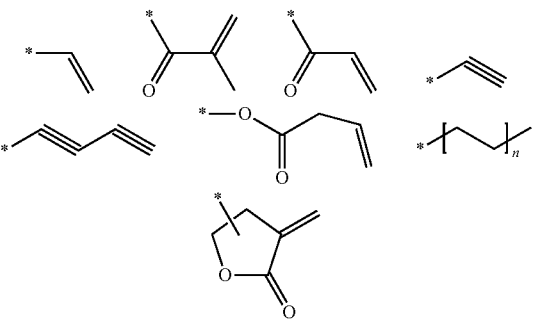

and n1 to n3 are each independently 0 or 1.

In an embodiment, the reactive monomer may be a triazole compound represented by Formula 2.

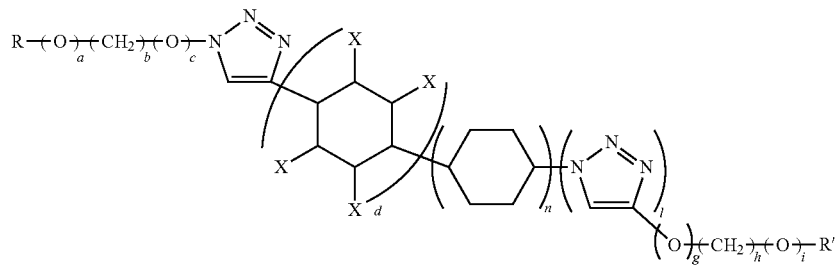

where b and h are each independently an integer from 1 to 20, a, c, e, f, g, and i are each independently an integer of 0 or 1, and d is an integer from 1 to 3, each X is independently H, —CH$_3$, —(CH$_2$)$_m$CH$_3$ (where m is an integer from 1 to 20), F, Br, I, —OH, —C$_3$H$_7$, —NH$_2$, or CN, and R and R' are each independently a group in Formula 2a:

[Formula 2a]

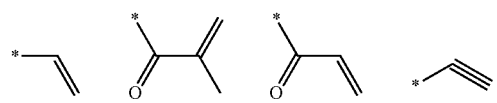

[Formula 2]

-continued

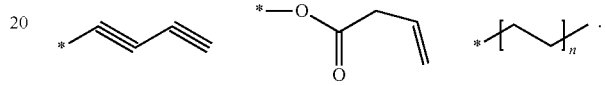

In an embodiment, the reactive monomer may be a compound in Formula 3.

[Formula 3]

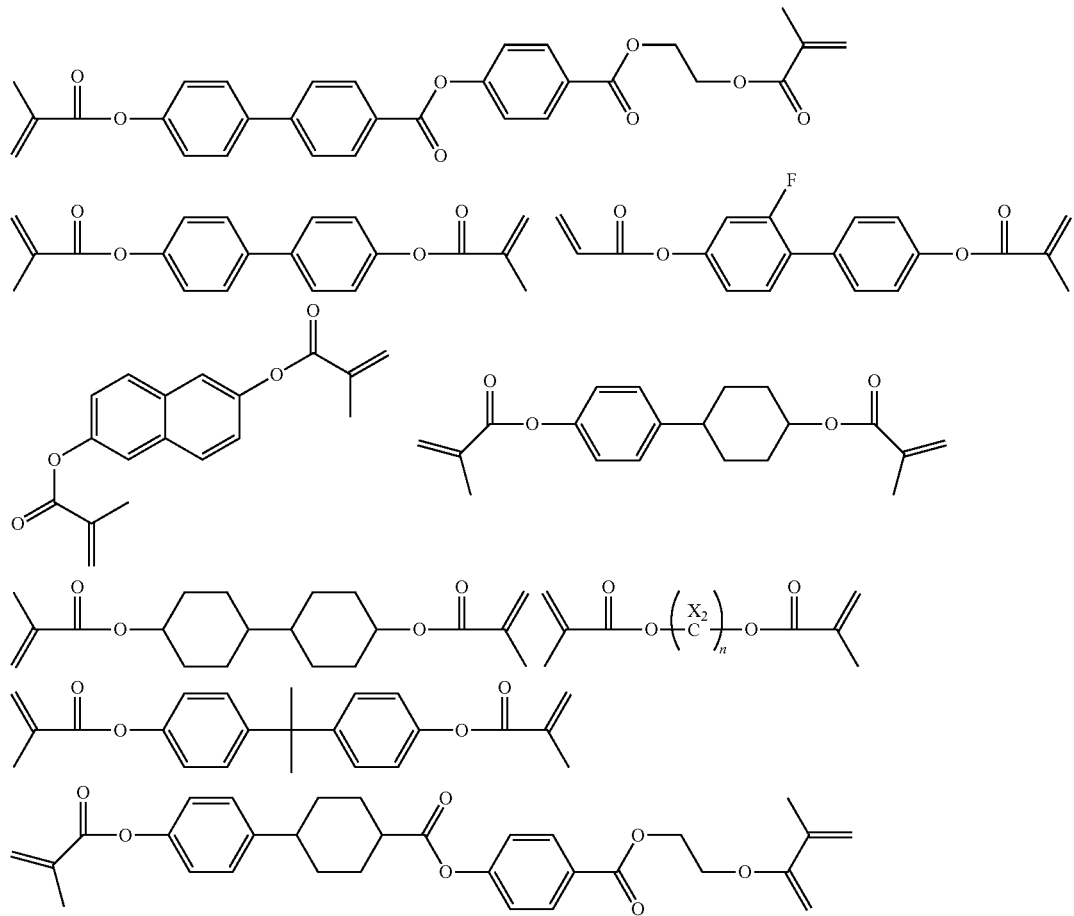

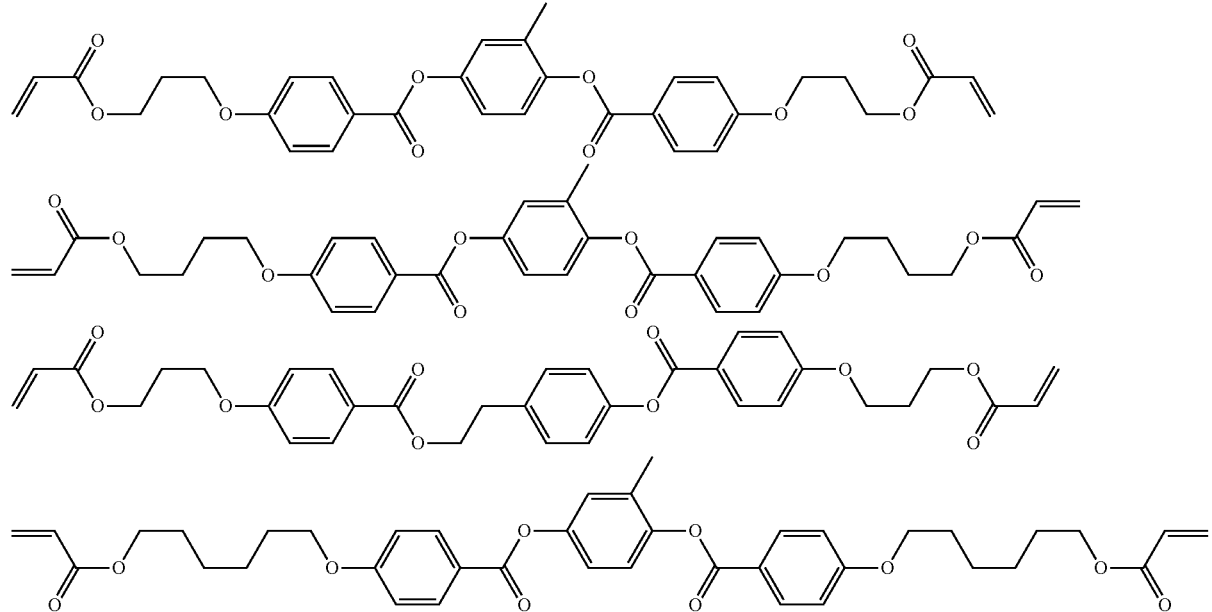

where X is H, —CH$_3$, —(CH)$_2$CH$_3$, F, Br, I, —OH, —C$_3$H$_7$, —NH$_2$, or —CN, and n is an integer from 1 to 20.

In an embodiment, the reactive monomer may further include a compound represented by Formula 4.

R$_5$—B—VA　　　　　　　　　　　　　　　　[Formula 4]

where VA is a group in Formula 4a,

[Formula 4a]

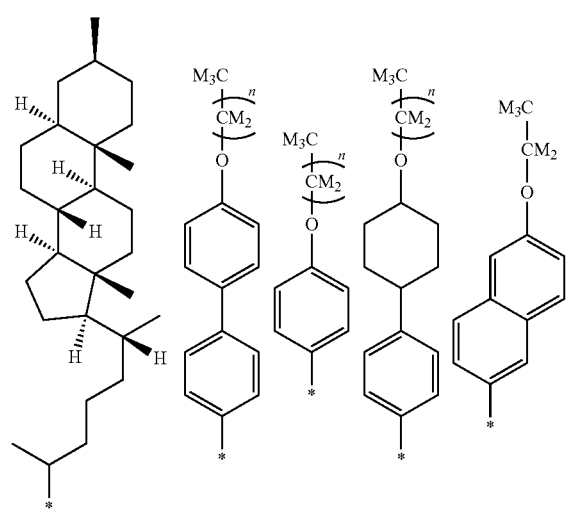

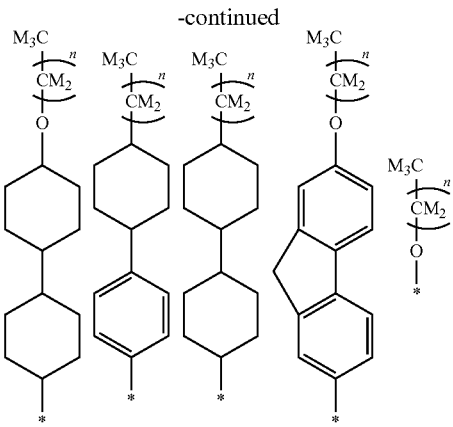

wherein each M is independently H, —CH$_3$, —(CH$_2$)$_n$CH$_3$, F, Br, I, —OH, —C$_3$H$_7$, —NH$_2$, or —CN, n is an integer from 1 to 20, and R$_5$ is a group in Formula 4b,

[Formula 4b]

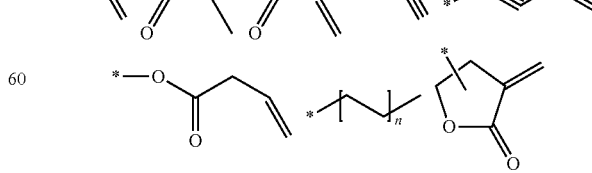

B is a group in Formula 4c, where each n is independently an integer from 1 to 20.

[Formula 4c]

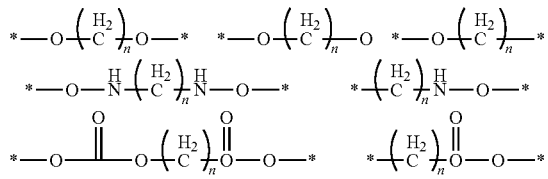

BRIEF DESCRIPTION OF THE DRAWINGS

The accompanying drawings are included to provide a further understanding of the inventive concept. The above and other aspects, advantages and features of this disclosure will become more apparent by describing in further detail embodiments thereof with reference to the accompanying drawings. In the drawings.

DETAILED DESCRIPTION

Figure 1:
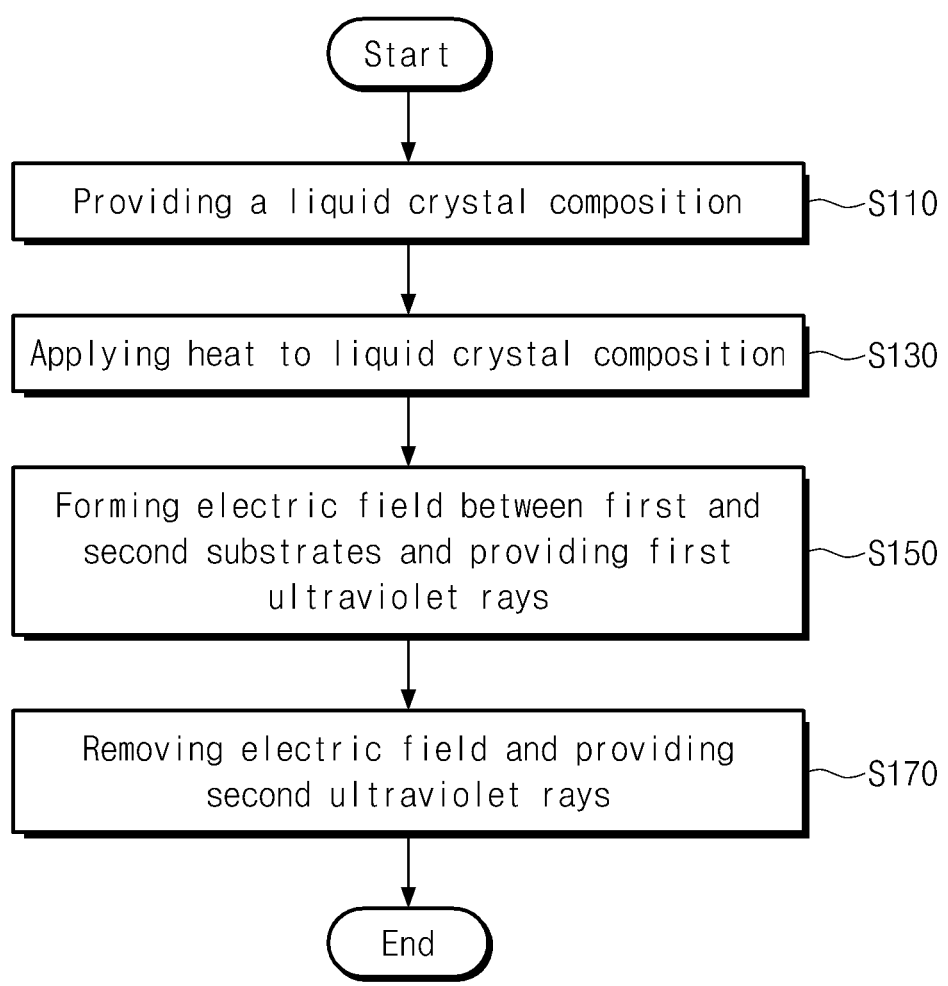
FIGS. 1 and 2 are flowcharts showing a method for manufacturing a liquid crystal display apparatus according to an embodiment.

The inventive concept now will be described more fully hereinafter with reference to the accompanying drawings, in which various embodiments are shown. The inventive concept may be embodied in different forms and may have various modifications, and exemplary embodiments of the inventive concept will be described below in more detail with reference to the accompanying drawings. The inventive concept, however, should not be construed as limited to the embodiments set forth herein. Rather, these embodiments should be understood to include modifications, equivalents, or substitutes within the spirit and scope of the inventive concept.

In the drawings, like reference numerals refer to like elements throughout. The dimensions of layers and regions are exaggerated for clarity of illustration. It will be understood that, although the terms "first," "second," "third," etc. may be used herein to describe various elements, components, regions, layers and/or sections, these elements components, regions, layers and/or sections should not be limited by these terms. These terms are only used to distinguish one element from another element. Thus, a "first element," "component," "region," "layer" or "section" could be termed a second element, component, region, layer or section without departing from the teachings herein. Similarly, a second element, component, region, layer or section could be termed a first element, component, region, layer or section.

The terminology used herein is for the purpose of describing particular embodiments only and is not intended to be limiting. As used herein, the singular forms "a," "an," and "the" are intended to include the plural forms as well, unless the context clearly indicates otherwise. "Or" means "and/or." As used herein, the term "and/or" includes any and all combinations of one or more of the associated listed items.

It will be further understood that the terms "comprises" and/or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

It will also be understood that when a layer, a film, a region, a plate, etc. is referred to as being 'on' another part, it can be directly on the other part, or intervening layers may also be present. On the contrary, it will be understood that when a layer, a film, a region, a plate, etc. is referred to as being 'under' another part, it can be directly under, and one or more intervening layers may also be present.

"About" or "approximately" as used herein is inclusive of the stated value and means within an acceptable range of deviation for the particular value as determined by one of ordinary skill in the art, considering the measurement question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the present specification, "-*" means the position of the connection.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a method for manufacturing a liquid crystal display apparatus according to an embodiment will be explained in detail with reference to the accompanying drawings.

FIG. 1 is a flowchart showing a method for manufacturing a liquid crystal display apparatus according to an embodiment. The method for manufacturing a liquid crystal display apparatus may include a step of providing a liquid crystal composition between a first substrate and a second substrate S110, a step of applying heat to the liquid crystal composition S130, and a step of forming an electric field between the first substrate and the second substrate and providing first ultraviolet rays S150. In an embodiment, a step of removing the applied electric field and providing second ultraviolet rays S170 may be further included.

In the method for manufacturing a liquid crystal display apparatus, the step of providing a liquid crystal composition S110 is a step of supplying a liquid crystal composition between a first substrate and a second substrate. The liquid crystal composition may include liquid crystal molecules, a thermal initiator, and a reactive monomer. In this case, the first substrate may be obtained by forming a pixel electrode on a first base substrate. The second substrate facing the first substrate may be a substrate including a common electrode layer formed thereon. The first substrate, the second substrate, and the liquid crystal composition of the liquid crystal display apparatus will be explained again hereinafter.

In the method for manufacturing a liquid crystal display apparatus according to an embodiment, the step of providing the liquid crystal composition S110 is a step of providing the liquid crystal composition between a first substrate and a second substrate. The liquid crystal composition may include liquid crystal molecules, a thermal initiator, and a reactive monomer. In this case, pixel electrodes may be formed on the first substrate. In addition, the second substrate facing the first substrate may be a substrate including a common electrode layer formed thereon. The first substrate, the second substrate, and the liquid crystal composition of the liquid crystal display apparatus will be explained hereinafter.

In the step of providing the liquid crystal composition S110, a method of providing a liquid crystal display apparatus with liquid crystal molecules may be used. The liquid crystal display apparatus may be provided with a liquid crystal composition using a liquid crystal dropping method or a liquid crystal injecting method. However, the embodiment is not limited thereto, and any method capable of providing liquid crystal molecules between a first substrate and a second substrate may be used, without limitation.

When a liquid crystal composition is provided using the liquid crystal dropping method, the liquid crystal composition may be applied on at least one of the first substrate or the second substrate prior to combining the first substrate and the second substrate. The liquid crystal composition may be provided by dropping the liquid crystal composition on some regions of at least one of the first or the second substrate. The liquid crystal composition may then be diffused and distributed across the entire surface of the substrate. For example, the liquid crystal composition dropped on regions of the substrate, may be diffused and distributed across the surface by aligning, combining, and applying pressure to the first substrate and the second substrate. In this case, the liquid crystal composition may be diffused so as to be distributed on the entire surface of the display area of the display apparatus.

When the liquid crystal composition is provided using the liquid crystal injecting method, the first substrate and the second substrate may be combined prior to injecting the liquid crystal composition therebetween. The liquid crystal composition may be injected via a liquid crystal injecting inlet formed between the first substrate and the second substrate. For example, the liquid crystal composition may be supplied between the first substrate and the second substrate in a vacuum chamber.

After supplying the liquid crystal composition between the first substrate and the second substrate S110, a step of applying heat to the liquid crystal composition S130 may be performed. The step of applying heat to the liquid crystal composition S130 may be accomplished by applying heat to the first substrate, the second substrate, and the liquid crystal composition disposed between the first substrate and the second substrate. The heating process may be an indirect heating process conducted in a high temperature chamber. However, the heating method is not limited thereto, and the heat may also be directly applied to the first substrate and the second substrate, between which is the liquid crystal composition.

The step of applying heat to the liquid crystal composition S130 may include the forming of radicals by the thermal initiator included in the liquid crystal composition, and the formation of alignment inducing patterns on the first substrate and on the second substrate by the polymerization of the reactive monomers.

An electric field may be formed between the first substrate and the second substrate including the alignment inducing patterns formed thereon. The electric field may be formed by the voltage difference between the first substrate and the second substrate. In the presence of the electric field, the liquid crystal molecules may be aligned at a certain pretilt angle by the alignment inducing patterns formed on the first substrate and on the second substrate. The electric field formed between the first substrate and the second substrate may be maintained for a certain time period.

When the electric field is formed between the first substrate and the second substrate, first ultraviolet rays may be provided at least partially simultaneously or simultaneously. Forming the electric field and the providing of the first ultraviolet rays are conducted during a same process. By exposing the liquid crystal composition between the first substrate and the second substrate to the first ultraviolet rays, the liquid crystal molecules may be stably aligned on the alignment inducing patterns. In addition, by irradiating the first ultraviolet rays, the polymerization degree of the thermally polymerized reactive monomers may increase, and the additional polymerization reaction of any unreacted reactive monomers may be induced. Meanwhile, the electric field formed between the first substrate and the second substrate may be maintained during the provision of the first ultraviolet rays. The forming of the electric field between the first substrate and the second substrate, and the providing of the first ultraviolet rays, may be conducted in the same apparatus. After pretilting the liquid crystal molecules by applying the electric field and providing the first ultraviolet rays, the pretilt angle of the liquid crystal molecules may be maintained even after the electric field has been removed.

After providing the first ultraviolet rays, an additional step of providing second ultraviolet rays S170 may be further included. For example, the second ultraviolet rays may have a wavelength in the same region as that of the first ultraviolet rays. In this case, the dosage of the second ultraviolet rays may be smaller than the dosage of the first ultraviolet rays. That is, the intensity of the second ultraviolet rays may be weaker than the intensity of the first ultraviolet rays.

The second ultraviolet rays may be provided after removal of the electric field formed between the first substrate and the second substrate. By exposing the liquid crystal composition to the second ultraviolet rays, the amount of unreacted residual reactive monomers may be decreased. By adding the step of providing the second ultraviolet rays, the impurity generation in a liquid crystal layer may be minimized. Accordingly, displaying quality of a display apparatus may be improved and good reliability may be attained.

Figure 2:
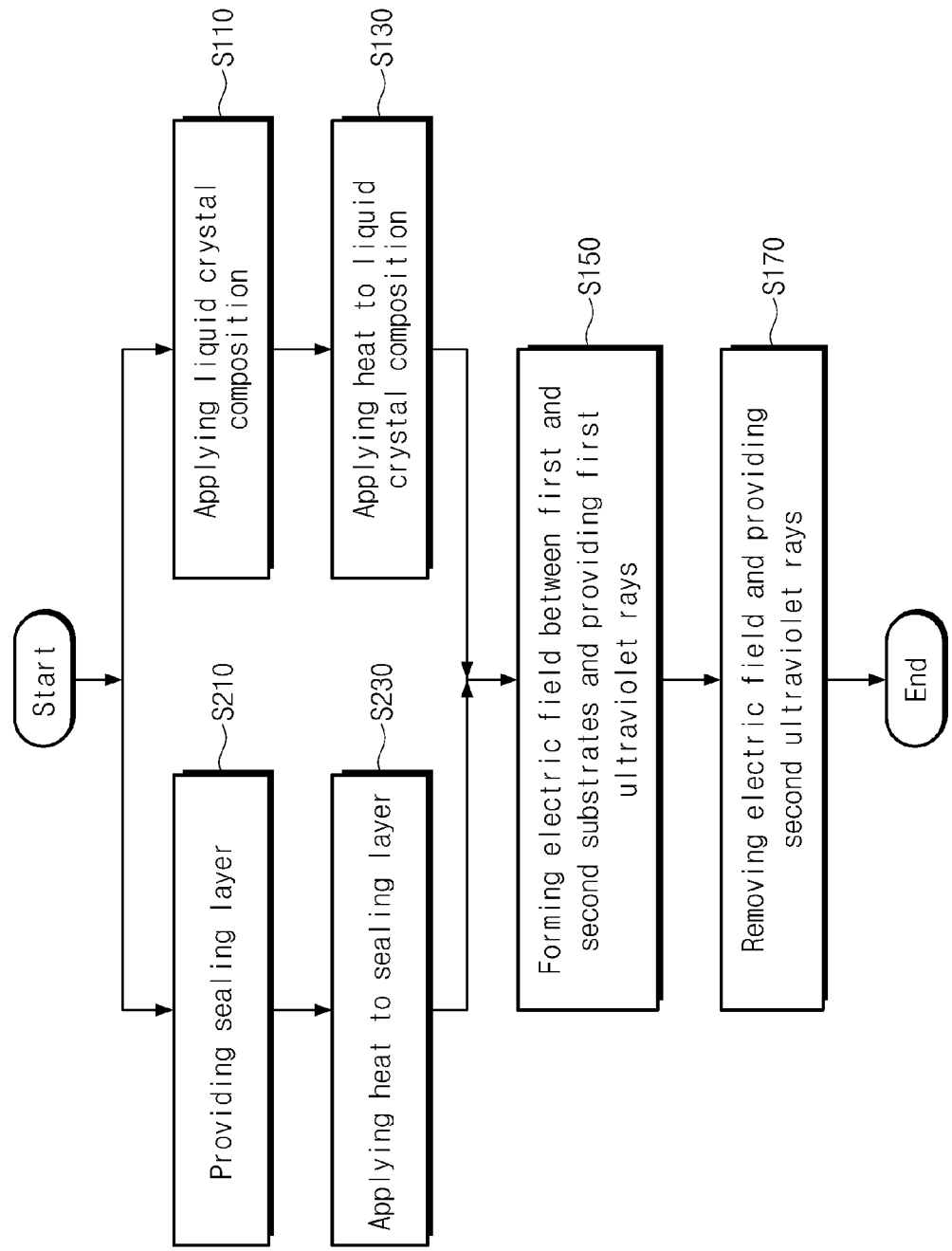

FIG. 2 is a flowchart showing a method for manufacturing a liquid crystal display apparatus including a step of providing a sealing material. In an embodiment, in addition to the method for manufacturing a liquid crystal display apparatus shown in FIG. 1, a method for manufacturing a liquid crystal display apparatus may further include a step of providing a sealing layer S210 and a step of applying heat to the sealing layer S230.

In FIG. 2, the step of applying the heat to the sealing layer S230 and the step of applying heat to the liquid crystal composition S130 may be conducted as separate processes. For example, the e first substrate may be provided with the liquid crystal composition and the second substrate may be provided with the sealing layer simultaneously. In addition, the sealing layer may be provided prior to providing the liquid crystal composition. However, the embodiment is not limited thereto, and the step of applying the heat to the sealing layer (S230) and the step of applying the heat to the liquid crystal composition (S130) may be conducted at least partially simultaneously, simultaneously, or in a consecutive order. The step of applying the heat to the sealing layer (S230) and the step of applying the heat to the liquid crystal composition (S130) may be conducted during a same process.

After that, the step of forming the electric field and providing the first ultraviolet rays S150 and the step of removing the electric field and providing the second ultraviolet rays S170 may be conducted by the same method as previously described for the method for preparing the liquid crystal display apparatus described in FIG. 1.

Even though not shown in FIG. 2, when a liquid crystal dropping method is used as the method of providing the liquid crystal composition, the step of combining a first substrate and a second substrate may be conducted after providing the liquid crystal composition. Alternatively, when a liquid crystal composition is provided via an inlet disposed between the first substrate and the second substrate, the step of providing the liquid crystal may be conducted after combining the first substrate and the second substrate.

Figure 3A:
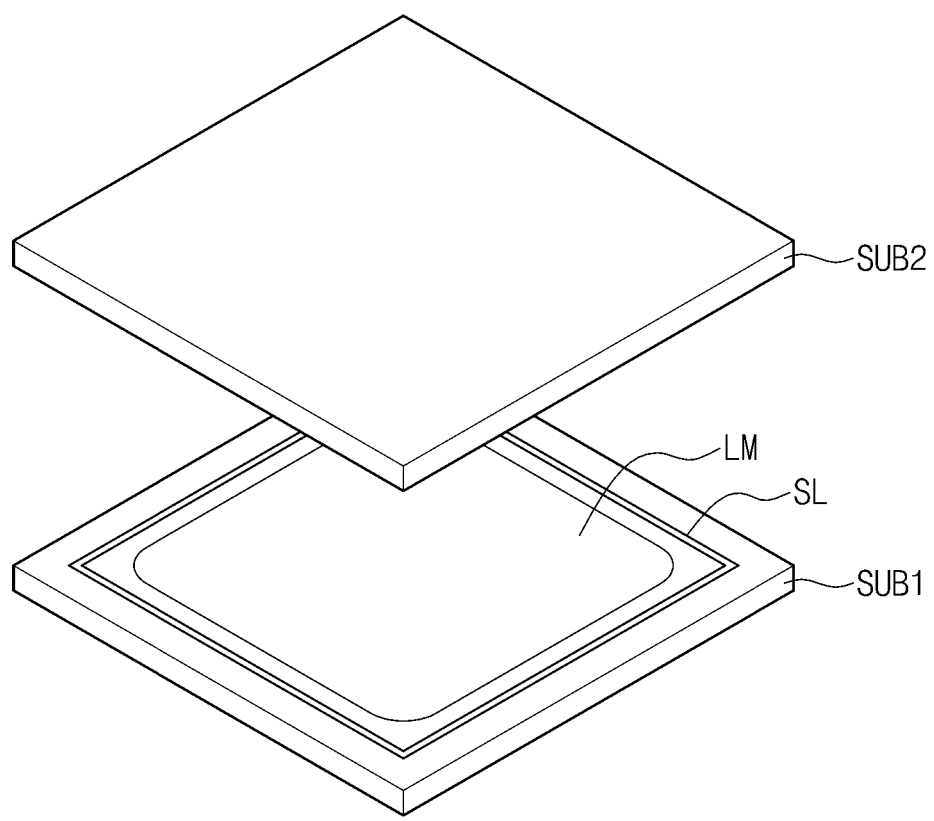
FIGS. 3A to 3E are schematic diagrams showing the steps for manufacturing a liquid crystal display apparatus according to an embodiment.

FIGS. 3A to 3E are schematic diagrams showing the manufacturing steps of a liquid crystal display apparatus according to an embodiment. FIG. 3A illustrates a step of providing a liquid crystal composition in the manufacture of a liquid crystal display apparatus. The liquid crystal display apparatus may be manufactured by including a first substrate SUB1, a second substrate SUB2 facing the first substrate SUB1, a liquid crystal composition LM disposed between the first substrate SUB1 and the second substrate SBU2, and a sealing layer SL. In the drawings, the liquid crystal composition LM and the sealing layer SL are provided on the first substrate SUB1, however the embodiment is not limited thereto, and the liquid crystal composition LM and the sealing layer SL may be provided on different substrates from each other.

The sealing layer SL may be formed by applying an uncured sealing material to the first substrate SUB1. The sealing material may be an attaching member fixing the first substrate and the second substrate and may be cured at high temperatures. The sealing layer SL may be formed between the first substrate SUB1 and the second substrate SUB2 at a certain predetermined thickness, and the sealing layer SL thus formed may have a thickness corresponding to a cell gap in the liquid crystal display apparatus.

When the liquid crystal composition is provided using the liquid crystal dropping method, and the liquid crystal composition is provided on the first substrate, the sealing layer may be provided on the second substrate. However, the embodiment is not limited thereto, and the liquid crystal composition and the sealing layer may be provided on the same substrate or on different substrates. In FIG. 3A, the liquid crystal composition LM is provided on a portion of the substrate SUB1. However the liquid crystal composition LM may be provided on the first substrate SUB1 and diffused across the surface to fill to a portion up to where the sealing layer SL is formed.

Figure 3B:
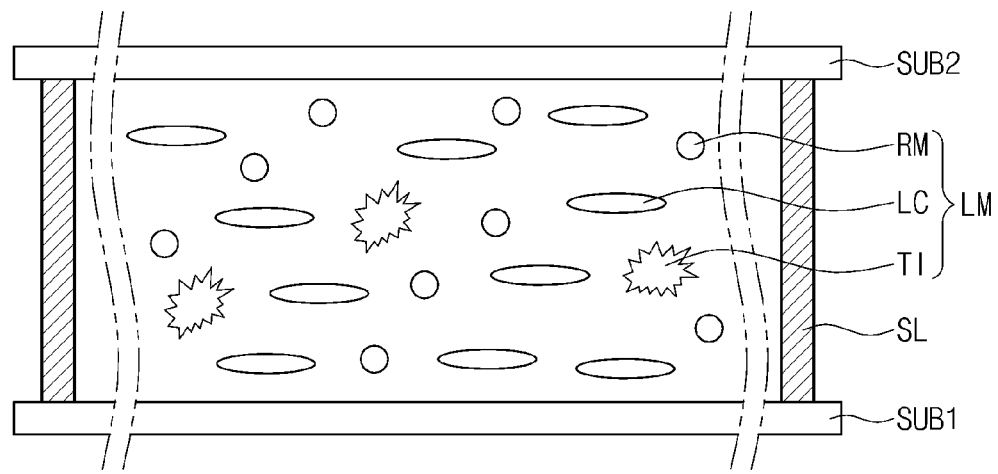

FIG. 3B is an illustration of a state in which the liquid crystal composition LM has been provided between the first substrate SUB1 and the second substrate SUB2, and the first substrate SUB1 and the second substrate SBU2 are aligned and combined. The sealing layer SL may be disposed in a peripheral region of the first substrate SUB1 and the second substrate SUB2 for fixing the first substrate SUB1 and the second substrate SUB2.

Figure 3C:
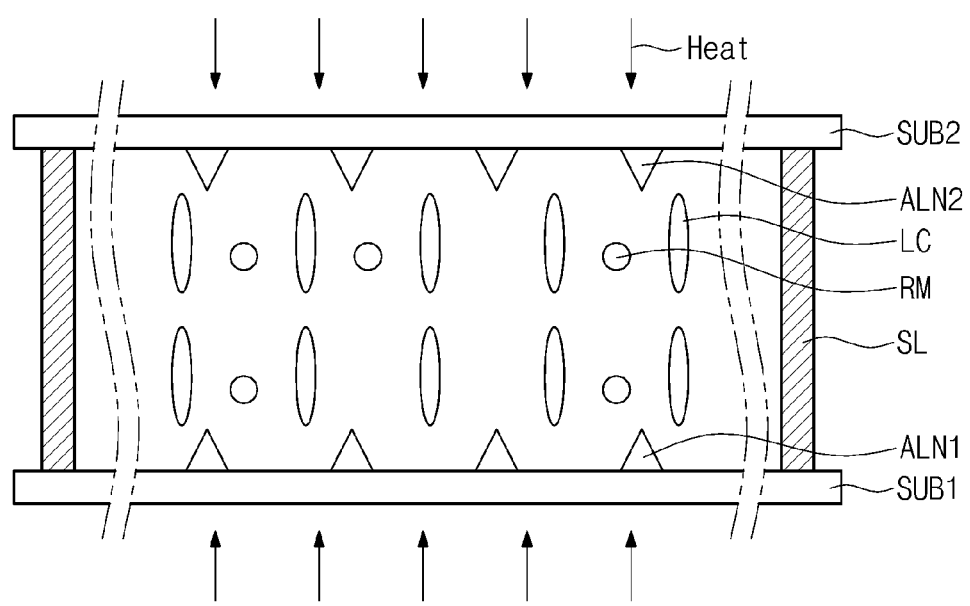

FIG. 3C illustrates a step of applying heat to a liquid crystal composition. The polymerization of the reactive monomers RM may occur due to the application of the heat, and alignment inducing patterns ALN1 and ALN2 may be formed on the first substrate SUB1 and the second substrate SUB2, respectively. Liquid crystal molecules LC may be vertically aligned and disposed by the alignment inducing patterns ALN1 and ALN2.

For example, the alignment inducing patterns ALN1 and ALN2 may be extruded on each substrate and may be formed as bump shapes. The alignment inducing patterns ALN1 and ALN2 may be formed on the sides of the first substrate SUB1 and the second substrate SUB2 which face one another. In FIG. 3C, the cross-section of the alignment inducing patterns ALN1 and ALN2 in a thickness direction of a liquid crystal layer is shown to be triangular in shape, however the shape of the alignment inducing patterns ALN1 and ALN2 is not limited thereto.

The alignment inducing patterns ALN1 and ALN2 may be formed in a random pattern on the first substrate SUB1 and the second substrate SUB2. In addition, the size of the alignment inducing patterns ALN1 and ALN2 may be the same or may be different from each other.

The step of applying heat to the liquid crystal composition illustrated in FIG. 3C, may be a step of applying heat to the sealing layer to cure the sealing material. That is, the step of applying (i.e. providing) heat may be a seal bake process for curing the sealing material.

The seal bake process for curing the sealing material and the polymerization of the reactive monomers in the liquid crystal composition may be conducted simultaneously or partially simultaneously. The seal bake process is conducted when a sealing layer is provided to fix two substrates together during manufacturing of the liquid crystal display apparatus. Accordingly, in an embodiment, the efficiency of a process for the manufacture of a liquid crystal display apparatus may be improved by conducting the polymerization reaction using the seal bake process without adding a separate heating process for thermal polymerization of the reactive monomers.

In particular, since a liquid crystal display apparatus manufactured by the disclosed method for manufacturing a liquid crystal display apparatus does not include an alignment layer, which is different from a prior art liquid crystal display apparatus, the forming step of an alignment layer may be omitted in the manufacturing process. That is, of the formation of an alignment layer, including the steps of coating of an alignment film on a substrate to form an alignment film, pseudo-curing, and main-curing of the coated alignment film, may be omitted.

When the alignment inducing patterns are formed using the reactive monomers without forming an alignment layer, a photo polymerization method may be used to form alignment inducing patterns from the reactive monomers on the substrate rather than the thermal polymerization method disclosed in exemplary embodiments. When using the photo polymerization method, a step of applying first irradiation to the reactive monomers to initiate polymerization, and a step of applying second irradiation of ultraviolet rays to the alignment inducing patterns formed by the photo polymerization of the reactive monomers, may be conducted. In this case, the second irradiation of ultraviolet rays may be conducted while applying an electric field to the liquid crystal molecules. The second irradiation corresponds to a process of irradiating ultraviolet rays to fix the alignment inducing patterns formed by the polymerization reaction and to fix the liquid crystal molecules.

When comparing the method for manufacturing alignment inducing patterns using a photo polymerization method with the method for manufacturing a liquid crystal display apparatus according to an embodiment in which a polymerization process and a seal bake process for applying a sealing layer with heat are conducted at the same time, the first photo polymerization process may be omitted. Accordingly, a separate apparatus for photo polymerization is not required by the methods disclosed herein, and as a result, productivity may be improved by conducting the seal bake process and the thermal polymerization process simultaneously.

The temperature and applying time of the heat provided to the liquid crystal composition may be changed based upon the type of thermal initiator included in the liquid crystal composition. The heat provided for the polymerization reaction may be selected in consideration of the reactivity of the thermal initiator and storage stability. For example, the polymerization reaction may be conducted at a temperature from about 70° C. to about 150° C., however the reaction temperature is not limited thereto. For example, the thermal polymerization of the reactive monomers may be conducted simultaneously with the seal bake process at the curing temperature of the sealing material, for example, at a temperature of about 100° C. to about 120° C.

Figure 3D:
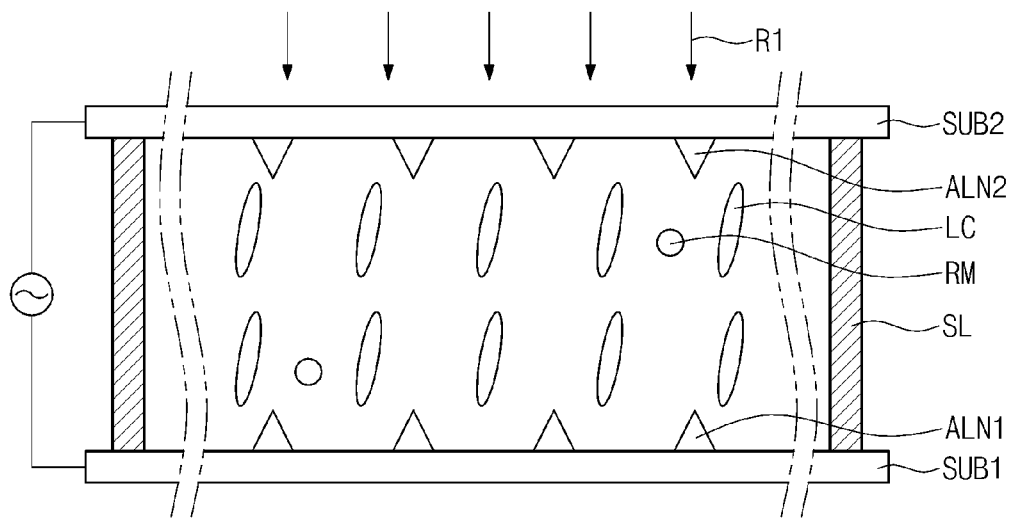

FIG. 3D illustrates a step of forming an electric field between the first substrate SUB1 and the second substrate SUB2 and providing first ultraviolet rays R1. After forming the alignment inducing patterns ALN1 and ALN2 on the first substrate SUB1 and the second substrate SUB2 by the thermal polymerization reaction, an electric field may be formed between the first substrate SUB1 and the second substrate SUB2. The applied electric field pretilts the liquid crystal molecules LC thus formed. In addition, the first ultraviolet rays R1 may be provided to the liquid crystal composition. In this case, the step of forming the electric field between the first substrate SUB1 and the second substrate SUB2, and the step of providing first ultraviolet rays to the first substrate SUB1 and the second substrate SUB2 with the liquid crystal composition disposed therebetween, may be conducted simultaneously.

In the step of providing the first ultraviolet rays while applying the electric field, the liquid crystal molecules may be aligned at a pretilt angle of a certain degree with respect to the substrate. In addition, the polymerization of unreacted reactive monomers may be additionally conducted. Meanwhile, by providing the first ultraviolet rays, the liquid crystal molecules with the pretilt angle may be stably aligned adjacent to the alignment inducing patterns.

Figure 3E:
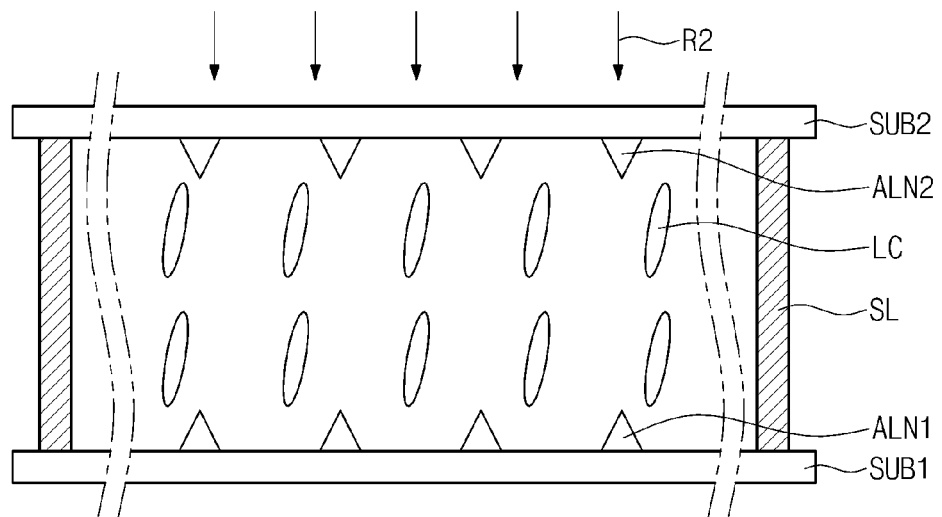

Then, FIG. 3E illustrates a step of removing the electric field formed between the first substrate SUB1 and the second substrate SUB2 and providing second ultraviolet rays R2. By providing the second ultraviolet rays R2, the additional reaction of the unreacted reactive monomer may be conducted, and the polymerization degree of a polymer produced by the polymerization reaction of the reactive monomer may increase. In this case, the step of providing the second ultraviolet rays R2 may be conducted in a state where the electric filed formed between the first substrate SUB1 and the second substrate SUB2 formed during providing the first ultraviolet rays is removed.

For example, the second ultraviolet rays may be ultraviolet rays having a wavelength in the same region as the wavelength of the first ultraviolet rays. In addition, the step of irradiating the second ultraviolet rays is used to remove unreacted materials in a liquid crystal layer, and the intensity of the second ultraviolet rays may be weaker than that of the first ultraviolet rays.

In the method for manufacturing a liquid crystal display apparatus according to an embodiment, the alignment inducing patterns may be formed on the substrate by a thermal polymerization method, and the step of forming an alignment layer in a prior art method for manufacturing a liquid crystal display apparatus may be replaced therewith. Since the thermal polymerization process may be simultaneously conducted with the curing process of the sealing layer, the additional prior art process of irradiating ultraviolet rays to form the alignment inducing patterns is not required. In an embodiment of the disclosed method for manufacturing a liquid crystal display apparatus, the same display quality and reliability may be obtained as that of a prior art liquid crystal display apparatus provided with the alignment layer, and productivity may be also improved.

In an embodiment, the liquid crystal display apparatus provided by the exemplary method for manufacturing a liquid crystal display apparatus may be a super vertical alignment (SVA) mode display apparatus. However, the embodiment is not limited thereto, and may be used in a vertical alignment mode or an in-plane switching mode liquid crystal display apparatus.

Meanwhile, in a normally black mode display apparatus, the display quality of the display apparatus may be evaluated by measuring black levels. A black mode display apparatus manufactured using the method for manufacturing a liquid crystal display apparatus according to an embodiment was confirmed to have similar black levels when compared to a prior art display apparatus in which liquid crystal molecules are aligned by forming an alignment layer. From the results, the alignment inducing patterns formed by thermally polymerizing the reactive monomers using a thermal initiator may maintain the stable alignment of liquid crystal molecules and may be a replacement for an alignment layer.

In an embodiment, the thermal initiator may be at least one of an azo compound, a peroxyester compound, a peroxy dicarbonate compound, and an acyl peroxide compound. In addition, the thermal initiator may be a redox initiator.

For example, the thermal initiator may be at least one of the compounds in Formula 5.

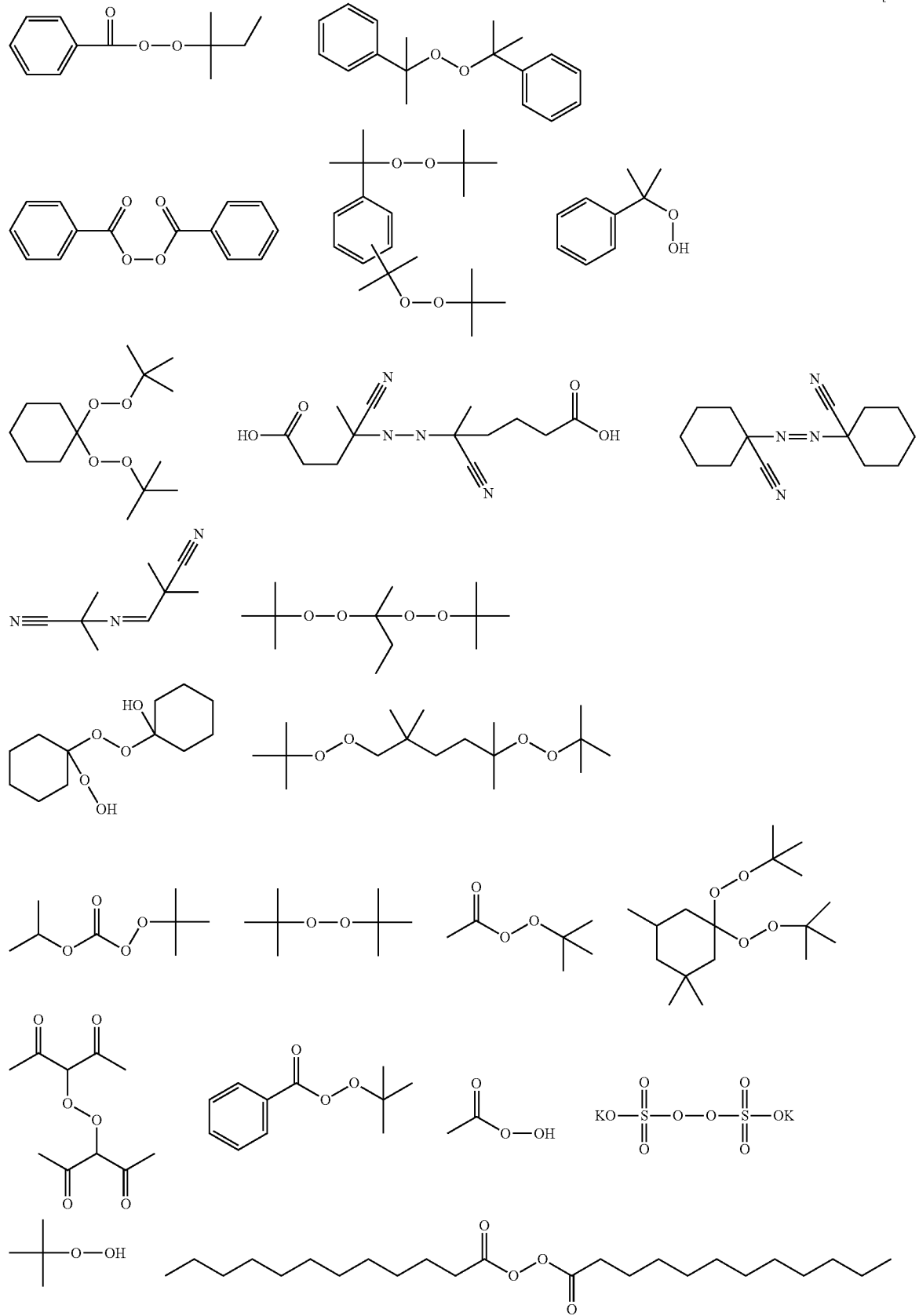
[Formula 5]

The reactive monomer included in the liquid crystal composition may include a polymerization reaction group which may be polymerized upon initiation by the thermal initiator, and a vertical alignment inducing group aligning liquid crystal molecules. Here, the group for a polymerization reaction may be at least one of

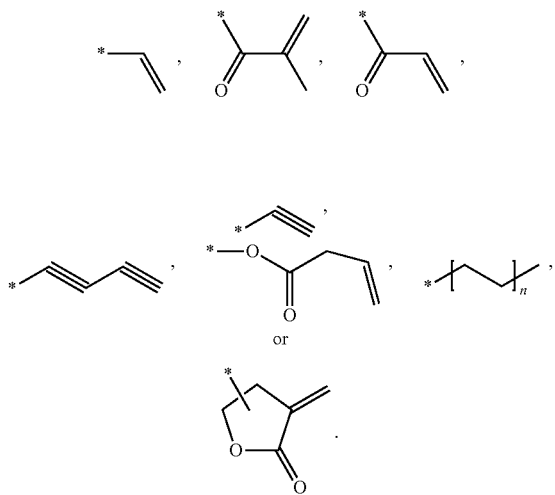

The reactive monomer included in the liquid crystal composition may include at least one of an acrylate compound, a methacrylate compound, an epoxy compound, an oxetane compound, a vinyl-ether compound, or a styrene compound.

Figure 4:
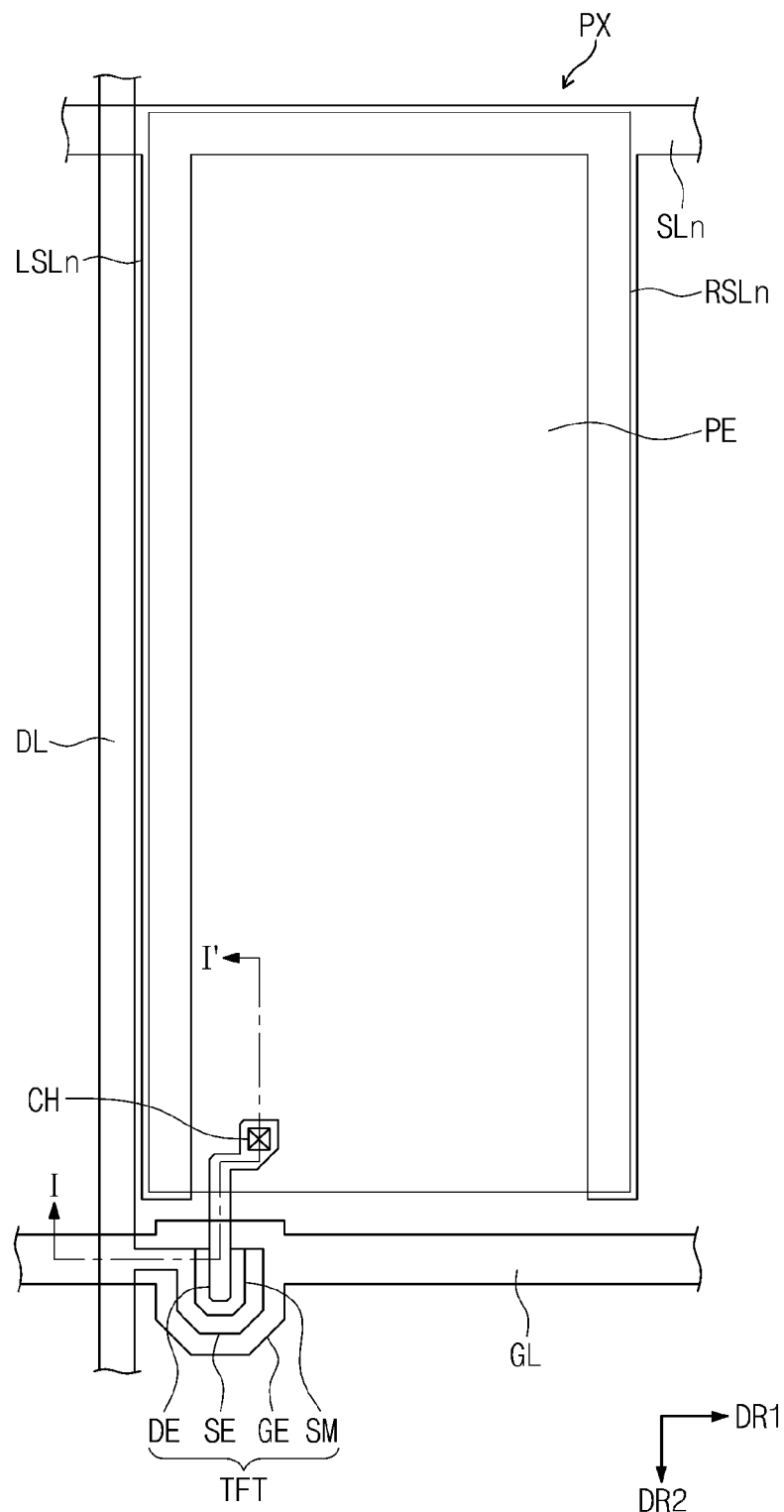
FIG. 4 is a plan view schematically showing one pixel among a plurality of pixels included in a display device manufactured by an embodiment of a method for manufacturing a liquid crystal display apparatus.
Figure 5:
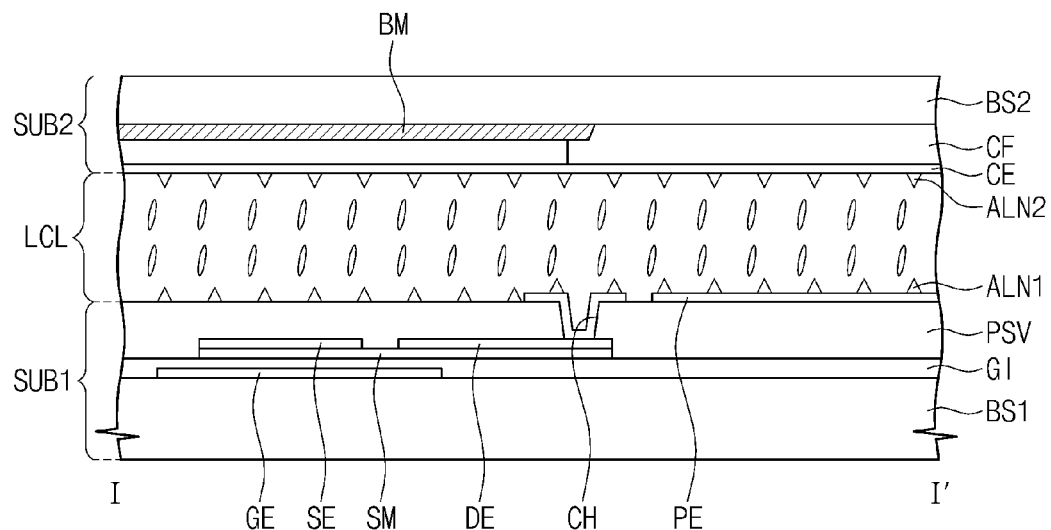
FIG. 5 is a cross-sectional view along line I-I' in FIG. 4.

FIGS. 4 and 5 illustrate a portion of a liquid crystal display apparatus manufactured by a method for manufacturing a liquid crystal display apparatus according to an embodiment. FIG. 4 is a plan view showing a portion of a pixel in a liquid crystal display apparatus, and FIG. 5 is a cross-sectional view of a liquid crystal display apparatus taken along line I-I' in FIG. 4.

For convenience of explanation, one pixel PX connected to one gate line among gate lines GL and one data line among data lines DL is shown in FIGS. 4 and 5, however the embodiment is not limited thereto. For example, one gate line and one data line may be connected with a plurality of pixels, or a plurality of gate lines and a plurality of data lines may be connected with one pixel.

Referring to FIGS. 4 and 5, the gate lines GL may be extended in a first direction DR1. The gate line may be formed on a first base substrate. The data lines DL may be extended in a second direction DR2 crossing the gate lines GL and the first direction DR1.

Each of the pixels PX may include a thin film transistor TFT, a pixel electrode PE connected with the thin film transistor TFT, and a storage electrode part (not shown). The thin film transistor TFT may include a gate electrode GE, a gate insulation layer GI, a semiconductor pattern SM, a source electrode SE, and a drain electrode DE. The storage electrode part may further include a storage line SLn extended in the first direction DR1, and a first branched electrode LSLn and a second branched electrode RSLn, branched from the storage line SLn and extending in the second direction DR2.

The gate electrode GE may be extruded from the gate lines GL or be provided on a portion of the gate lines GL. The gate electrode GE may be formed using a metal. The gate electrode GE may be formed using nickel, chromium, molybdenum, aluminum, titanium, copper, tungsten, or an alloy thereof. The gate electrode GE may be formed as a single layer or a multilayer. For example, the gate electrode GE may be a triple layer obtained by laminating molybdenum, aluminum, and molybdenum one by one, or a double layer obtained by laminating titanium and copper one by one. Alternatively, the gate electrode GE may be a single layer of an alloy of titanium and copper.

The semiconductor pattern SM is provided on the gate insulation layer GI. The semiconductor pattern SM is provided on the gate electrode GE with the gate insulation layer GI therebetween. A partial region of the semiconductor pattern SM is overlapped with the gate electrode GE. The semiconductor pattern SM includes an active pattern (not shown) provided on the gate insulation layer GI and an ohmic contact layer (not shown) formed on the active pattern. The active pattern may be formed using an amorphous silicon thin film, and the ohmic contact layer may be formed using an $n^+$ amorphous silicon thin film. The ohmic contact layer makes an ohmic contact between the active pattern and the source electrode SE and the drain electrode DE, respectively.

The source electrode SE is branched from the data line DL. The source electrode SE is formed on the ohmic contact layer and is partially overlapped with the gate electrode GE.

The drain electrode DE is provided apart from the source electrode SE with the semiconductor pattern SM therebetween. The drain electrode DE is formed on the ohmic contact layer and is partially overlapped with the gate electrode GE.

The source electrode SE and the drain electrode DE may be formed using nickel, chromium, molybdenum, aluminum, titanium, copper, tungsten, or an alloy thereof. The source electrode SE and the drain electrode DE may be formed as a single layer or a multilayer using a metal. For example, the source electrode SE and the drain electrode DE may be a double layer obtained by laminating titanium and copper one by one, or may be a single layer formed by using an alloy of titanium and copper.

Accordingly, the upper surface of the active pattern between the source electrode SE and the drain electrode DE is exposed and becomes a channel part forming a conductive channel between the source electrode SE and the drain electrode DE according to the application of a voltage to the gate electrode GE. The source electrode SE and the drain electrode DE are overlapped with the semiconductor layer SM at the region other than the channel part formed between the source electrode SE and the drain electrode DE.

The pixel electrode PE is connected to the drain electrode DE with a passivation layer PSV therebetween. The pixel electrode PE is partially overlapped with the storage line SLn, the first and second branch electrodes LSLn and RSLn to form a storage capacitor.

The passivation layer PSV covers the source electrode SE, the drain electrode DE, the channel part, and the gate insulation layer GI, and has a contact hole CH exposing a portion of the drain electrode DE. The passivation layer PSV may be formed of a material including, for example, silicon nitride or silicon oxide.

The pixel electrode PE is electrically connected to the drain electrode DE through the contact hole CH formed in the passivation layer PSV. The pixel electrode PE may be formed using a transparent conductive material. Particularly, the pixel electrode PE may be formed using a transparent conductive oxide. The transparent conductive oxide includes indium tin oxide (ITO), indium zinc oxide (IZO), indium tin zinc oxide (ITZO), and the like.

Meanwhile, the liquid crystal display apparatus includes a first substrate SUB1, a second substrate SUB2 facing the first substrate SUB1, and a liquid crystal layer LCL provided between the first substrate and the second substrate. The gate insulation layer GI is provided on the front of the first base substrate BS1 and covers the gate lines GL. Alignment inducing patterns ALN1 and ALN2 may be formed on the first substrate and the second substrate, respectively. The alignment inducing patterns ALN1 and ALN2 allow the liquid crystal molecules to be provided with a pretilt angle between the first substrate and the second substrate.

The second substrate SUB2 includes a second base substrate BS2, a color filter CF, a black matrix BM, and a common electrode CE. The second base substrate BS2 may be a polymer substrate, a plastic substrate, a glass substrate, or a quartz substrate. The second base substrate BS2 may be a transparent insulation substrate. The second base substrate may be flexible or rigid.

The color filter CF is provided on the second base substrate BS2 and provides colors. Here, the color filter CF is included in the second substrate SUB2, however the embodiment is not limited thereto. The color filter CF may be included in the first substrate SUB1.

The position of the black matrix BM corresponds to a blocking region of the first substrate SUB1. The blocking region may be defined as a region in which the data lines DL, the thin film transistor TFT, and the gate lines GL are formed. The black matrix BM is formed in the blocking region to prevent light leakage. In an embodiment, the black matrix BM is included in the second substrate SUB2, however the black matrix BM may be included in the first substrate SUB1, without limitation. Even though not shown, an insulation layer may be formed on the color filter CF and the black matrix BM.

The common electrode CE is provided on the second base substrate BS2 and forms an electric field with the pixel electrode PE to drive the liquid crystal layer LCL. In an embodiment, the common electrode CE is included in the second substrate SUB2, however the embodiment is not limited thereto. The common electrode CE may be included in the first substrate SUB1. The common electrode CE may be formed using a transparent conductive material. The transparent conductive material may be a conductive metal oxide such as ITO, IZO, ITZO, etc. On the common electrode CE of the second base substrate BS2, alignment inducing patterns ALN2 may be disposed.

A liquid crystal layer LCL including liquid crystal molecules is provided between the first substrate SUB1 and the second substrate SUB2. The liquid crystal layer LCL may be provided in which liquid crystal molecules having dielectric anisotropy are aligned. In the liquid crystal layer, reactive monomers may be included. The liquid crystal molecules are not limited and may be any commonly used liquid crystal molecules. For example, alkenyl liquid crystal molecules and alkoxy liquid crystal molecules may be used. The liquid crystal molecules LC used in an embodiment may have a negative dielectric anisotropy, however in another embodiment, they may have a positive dielectric anisotropy, without limitation.

Figure 6:
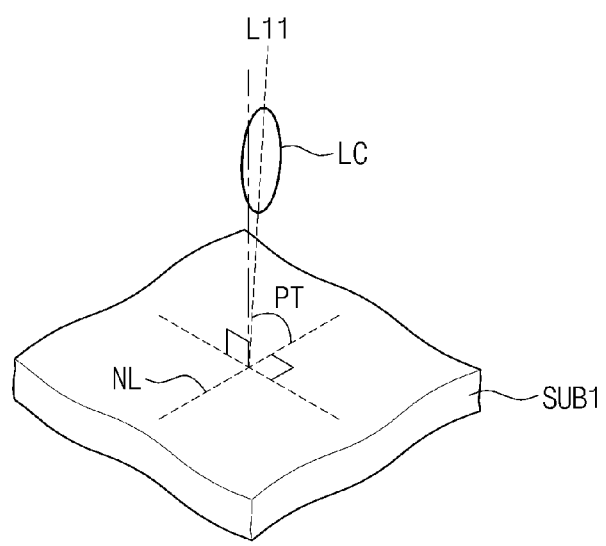
FIG. 6 is a diagram illustrating the pretilt angle (°) of a liquid crystal molecule.

FIG. 6 is a diagram illustrating the alignment position of a liquid crystal molecule disposed on the first substrate. For example, FIG. 6 may illustrate a liquid crystal molecule LC aligned with a pretilt angle on the first substrate SUB1. In FIG. 6, a liquid crystal molecule with a pretilt angle is shown and the alignment inducing patterns are omitted.

Referring to FIG. 6, a pretilt angle PT is formed by a first imaginary straight line NL extending along one side of the first substrate SUB1, and a second imaginary straight line L11 extending along the major axis of the liquid crystal molecule LC. The pretilt angle PT of the liquid crystal molecule LC measured in an embodiment may be an average value or a typical value of the pretilt angle of each liquid crystal molecule. In an embodiment, the pretilt angle of the liquid crystal molecule may be from about 80 degrees to about 89 degrees. For example, the pretilt angle of the liquid crystal aligned by the alignment inducing patterns may be from about 87 degrees to about 89 degrees.

In the method for manufacturing a liquid crystal display apparatus according to an embodiment, a liquid crystal composition including liquid crystal molecules, a thermal initiator, and a reactive monomer having a polymerization reaction group capable of being polymerized upon initiation by the thermal initiator, may be used.

In a liquid crystal composition according to an embodiment, the reactive monomer may be present in an amount of about 1.0 part by weight to about 3.0 parts by weight per 100 parts by weight of the liquid crystal molecules. In addition, the thermal initiator may be present in an amount of about 1.0 part by weight to about 10 parts by weight per 100 parts by weight of the reactive monomer. Particularly, the thermal initiator may be present in an amount of about 1.0 part by weight to about 3.0 parts by weight per 100 parts by weight of the reactive monomer.

When the amount of the thermal initiator with respect to the reactive monomer is less than about 1.0 part by weight, the amount of radicals produced for a polymerization reaction may be small, and a polymerization reaction rate may be too slow. If the amount of the thermal initiator is less than about 1.0 part by weight, the formation of alignment inducing patterns may not be easy.

In addition, in the case where the amount of the thermal initiator is greater than 3.0 parts by weight with respect to the amount of the reactive monomer, residual thermal initiator present after the polymerization reaction is completed may function as impurities. In addition, radical formation due to the thermal initiator may become excessive, and the polymerization degree of a polymer formed from the reactive monomer may not increase, thereby deteriorating mechanical properties of the alignment inducing patterns.

In an embodiment, the thermal initiator in the liquid crystal composition may be at least one of tert-amyl peroxybenzoate, 4,4'-azobis(4-cyanopentanoic acid), 1,1'-azobis(cyanocyclohexane), azobisisbutyronitrile (AIBN), 2,2-bis(tert-butylperoxy)butane, 1,1-bis(tert-butylperoxy)cyclohexane, benzoyl peroxide (BPO), 2,5-bis(tert-butylperoxy⁻)-2,5-dimethylhexane, bis[1-(tert-butylperoxy)-1-methylethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, and potassium peroxodisulfate.

That is, the thermal initiator may be at least one of the compounds represented in Formula 5.

[Formula 5]
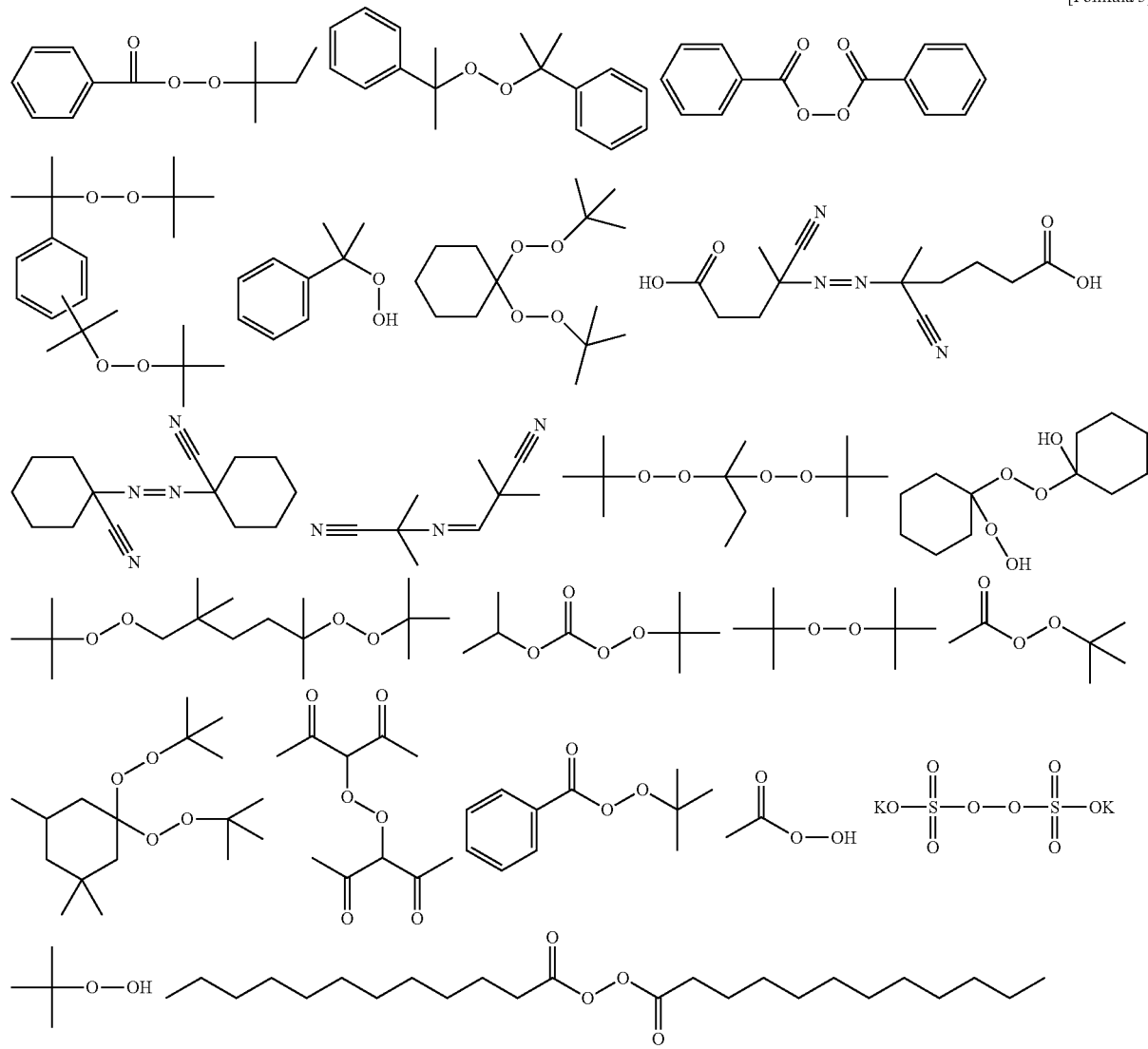
The thermal initiator may be selected based upon the thermal polymerization conditions. In an embodiment, BPO or AIBN may be selected as the thermal initiator.
In an embodiment, the liquid crystal composition may include a reactive monomer represented by the following Formula 1.
[Formula 1]
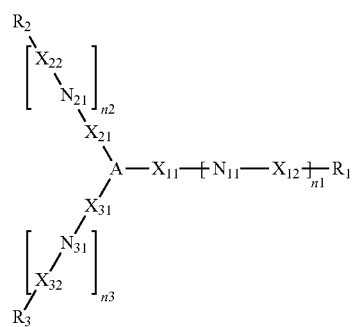
In Formula 1, a core part "A" may be a group in Formula 1a.
[Formula 1a]
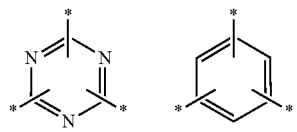
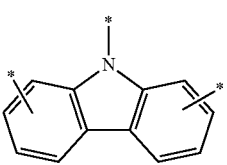 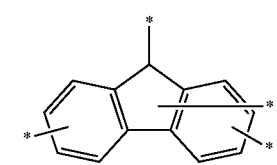

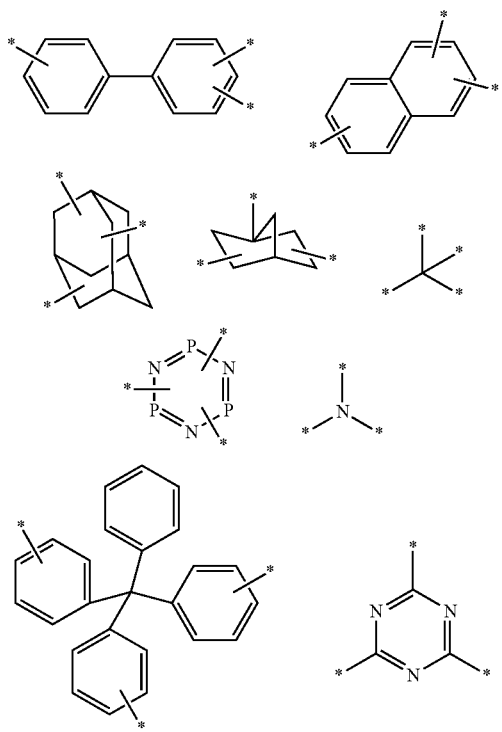

In Formula 1, $X_{11}$, $X_{12}$, $X_{22}$, and $X_{32}$ are each independently a direct bond, —O—, —COO—, or —NH—, and $N_{11}$, $N_{21}$, and $N_{31}$ are each independently a group in Formula 1b.

[Formula 1b]

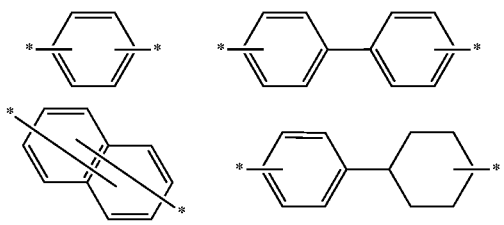

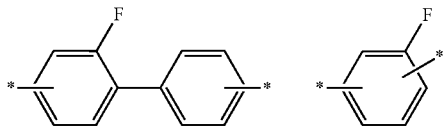

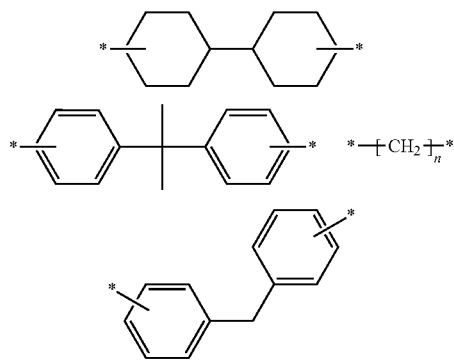

$R_1$ to $R_3$ are each independently a group in Formula 1c, and n1 to n3 may be each independently 0 or 1.

[Formula 1c]

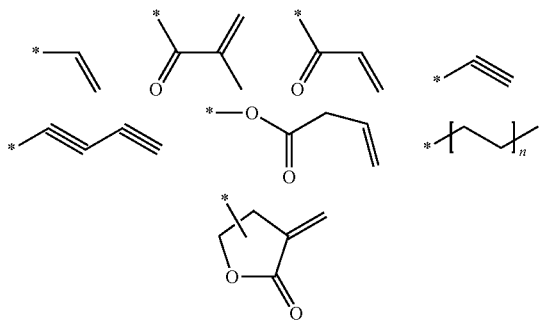

In the reactive monomer represented by Formula 1, two of the three reactive groups linked to the core part "A" may be a reaction group having a group capable of being polymerized to form alignment inducing patterns, while the remaining one group may be a group including a vertical alignment inducing group capable of aligning liquid crystal molecules.

In an embodiment, the reactive monomer in the liquid crystal composition may be represented by Formula 2. The reactive monomer represented by Formula 2 may be a triazole compound.

[Formula 2]

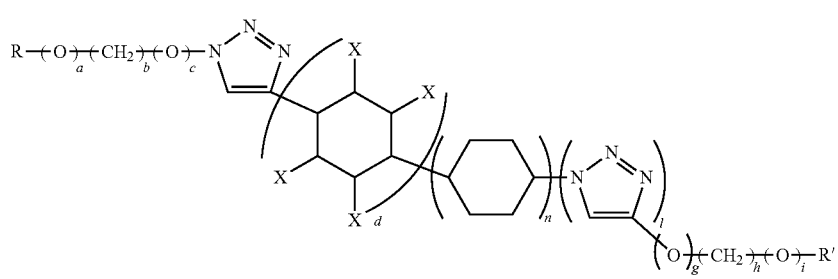

In Formula 2, b and h are each independently an integer from 1 to 20, a, c, e, f, g, and i are each independently an integer of 0 or 1, d is an integer from 1 to 3, X is H, —CH$_3$, —(CH$_2$)$_m$CH$_3$ (where m is an integer from 1 to 20), F, Br, I, —OH, —C$_3$H$_7$, —NH$_2$, or —CN, and R and R' are each independently a group in Formula 2a.

[Formula 2a]
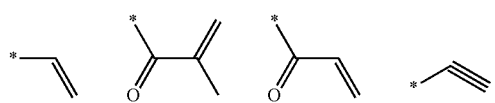
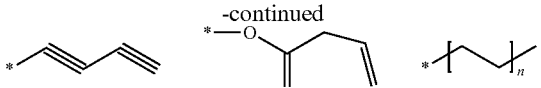
In an embodiment, the reactive monomer represented by Formula 2 may be a compound in Formula 2-1.
[Formula 2-1]
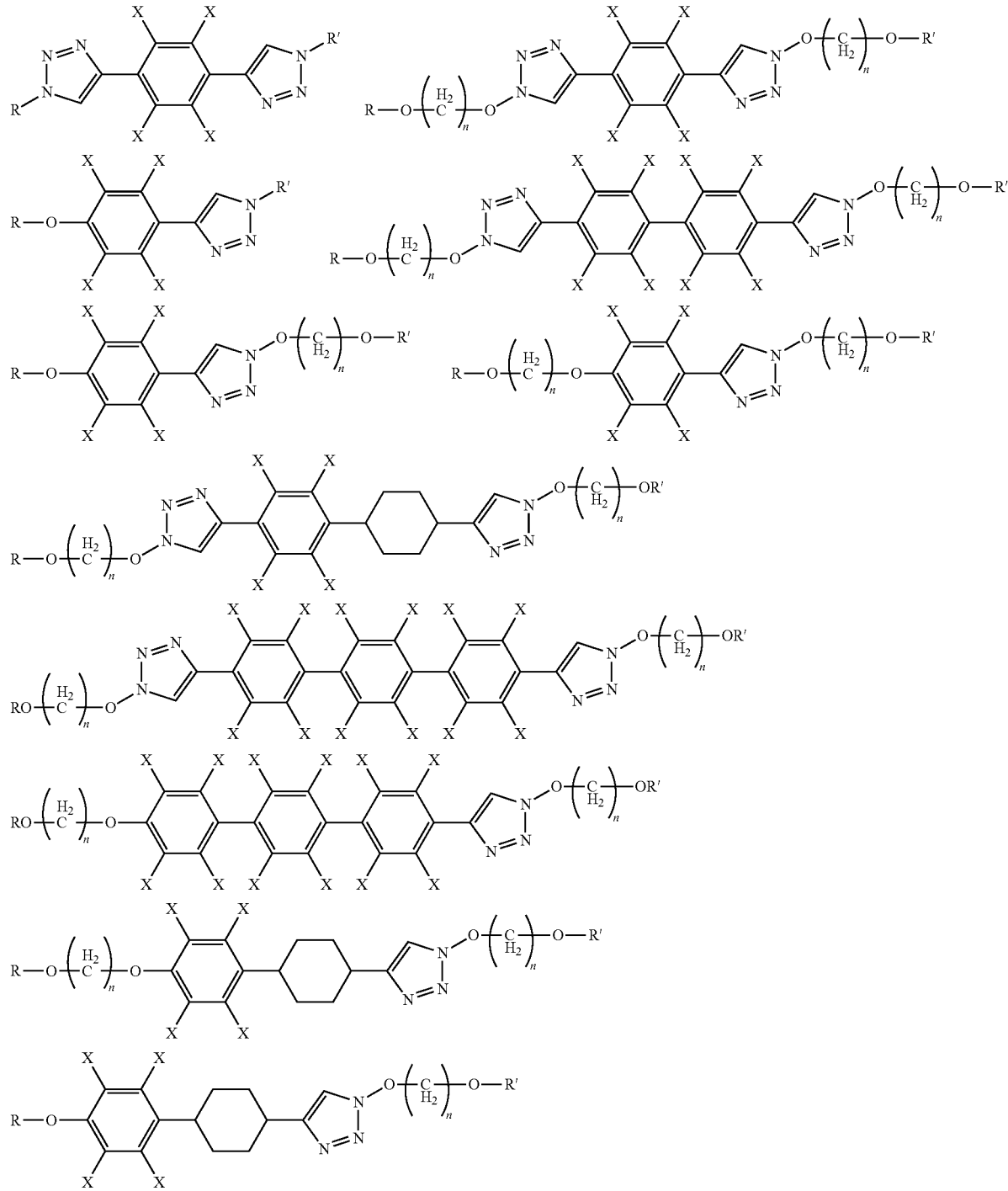

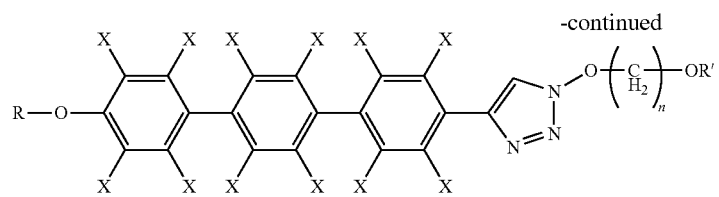
In addition, in an embodiment of the liquid crystal composition, the reactive monomer may be one of the compounds in Formula 3.
[Formula 3]
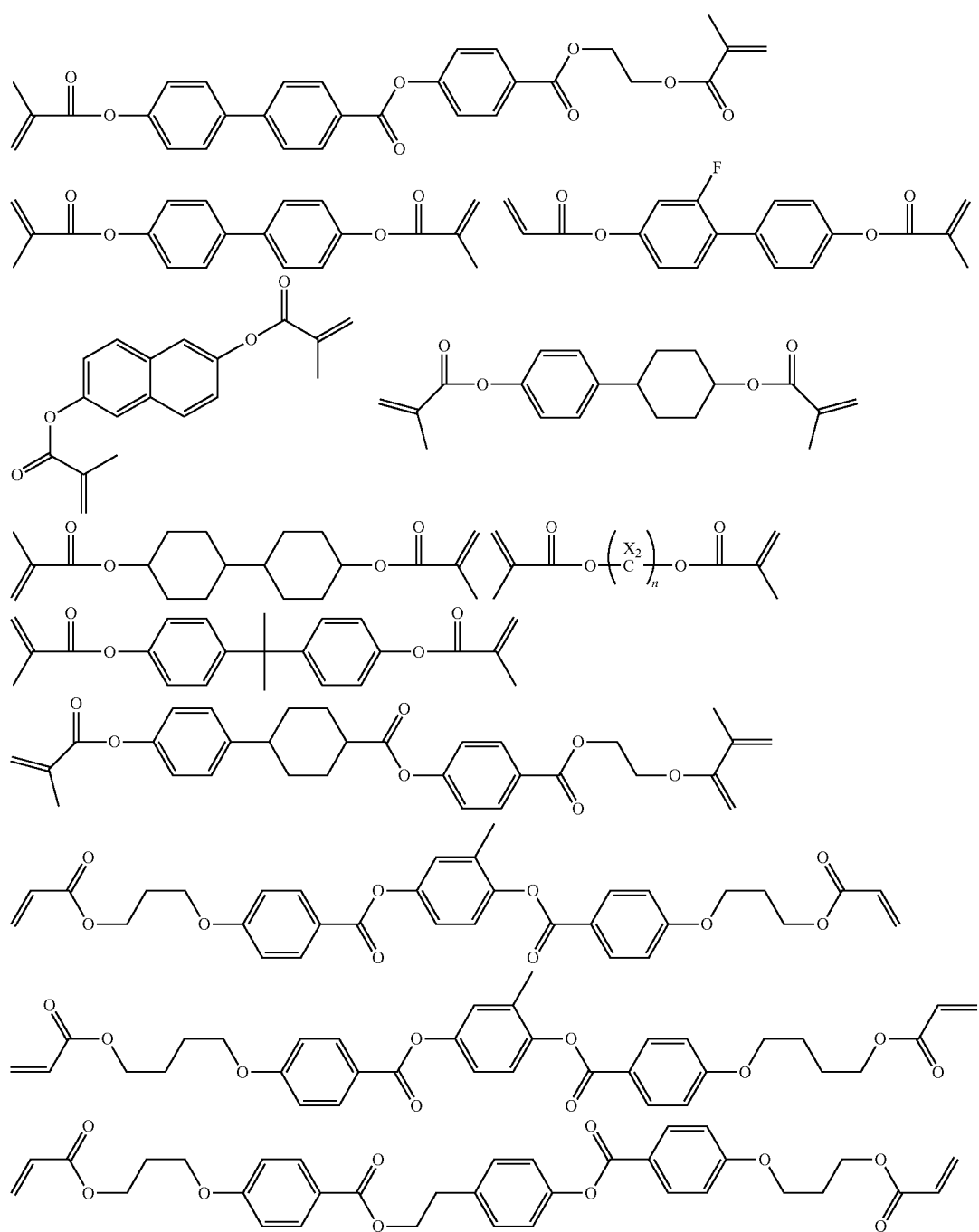

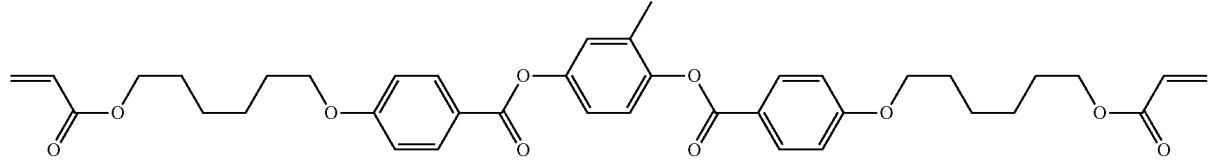

That is, the reactive monomer represented by Formula 3 may be a compound having a polymerization group of acrylate or methacrylate at both terminals thereof.

The liquid crystal composition may further include a reactive monomer represented by Formula 4 in addition to the reactive monomers of Formulae 1, 2, and 3. The reactive monomer represented by Formula 4 has a single group available for a polymerization reaction and may be used to improve the vertical alignment properties of liquid crystal molecules.

$$R_5—B—VA \qquad \text{[Formula 4]}$$

In Formula 4, VA may be a group in Formula 4a. In this case, VA may be a vertical alignment inducing group facilitating the vertical alignment of liquid crystal molecules.

[Formula 4a]

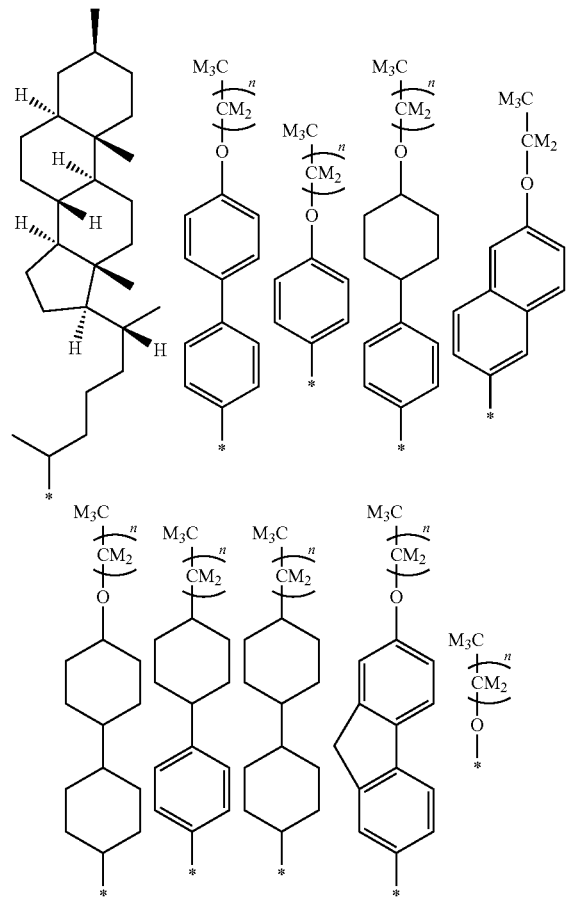

In Formula 4, each M is independently H, —CH$_3$, —(CH$_2$)$_n$CH$_3$, F, Br, I, —OH, —C$_5$H$_7$, —NH$_2$, or —CN, and each n is independently an integer from 1 to 20.

In Formula 4, R is a group in Formula 4b, and B is a group in Formula 4c, where each n is independently an integer from 1 to 20.

[Formula 4b]

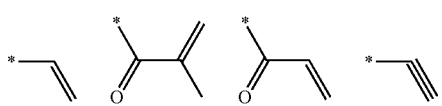

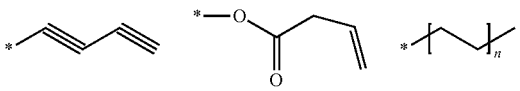

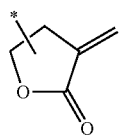

[Formula 4c]

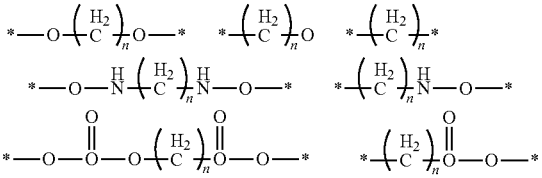

The reactive monomer represented by Formula 1 is referred to as a first reactive monomer, the reactive monomer represented by Formula 2 is referred to as a second reactive monomer, and the reactive monomer represented by Formula 3 is referred to as a third reactive monomer. In an embodiment, at least one of the first reactive monomer, the second reactive monomer, or the third reactive monomer may be included in the liquid crystal composition.

In addition, the reactive monomer represented by Formula 4 is referred to as a fourth reactive monomer. In an embodiment, the fourth reactive monomer and at least one of the first reactive monomer, the second reactive monomer, or the third reactive monomer may be included in the liquid crystal composition together.

In the case where different kinds of reactive monomers such as the first to third reactive monomers are combined and used in the liquid crystal composition, the solubility of the reactive monomers with respect to the liquid crystal molecules may increase. Due to the increased solubility, a greater amount of the reactive monomer may be used in the liquid crystal composition as compared to a composition including only one kind of reactive monomer. According to the increase of the amount of the reactive monomer included in the liquid crystal composition, the formation of the alignment inducing patterns may become easy, thereby improving the alignment property of the liquid crystal molecules.

Meanwhile, in a liquid crystal composition where the fourth reactive monomer is mixed with the first to third reactive monomers, the amount of the fourth reactive monomer may be smaller than the amount of each of the first to third reactive monomers. The fourth reactive monomer is a reactive monomer including a single group available for a polymerization reaction, and has lower degree of polymerization when compared to that of the first to third reactive monomers. Accordingly, the fourth reactive monomer may act as an alignment inducing group to facilitate the alignment of liquid crystal molecules rather than forming alignment inducing patterns.

In an embodiment, the above-described method for manufacturing a liquid crystal display apparatus is used to prepare an Example liquid crystal display. A prior art method for manufacturing a liquid crystal display apparatus including an alignment layer is used to prepare a Comparative Example. The liquid crystal composition of the Example includes liquid crystal molecules, a thermal initiator, and a reactive monomer. For example, the thermal initiator is BPO, and the reactive monomer is a compound represented by the following Formula 1-1.

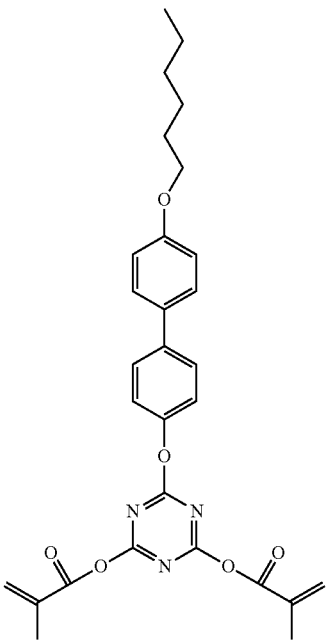

[Formula 1-1]

Meanwhile, the reactive monomer represented by Formula 1-1 may be prepared by the following Reaction 1.

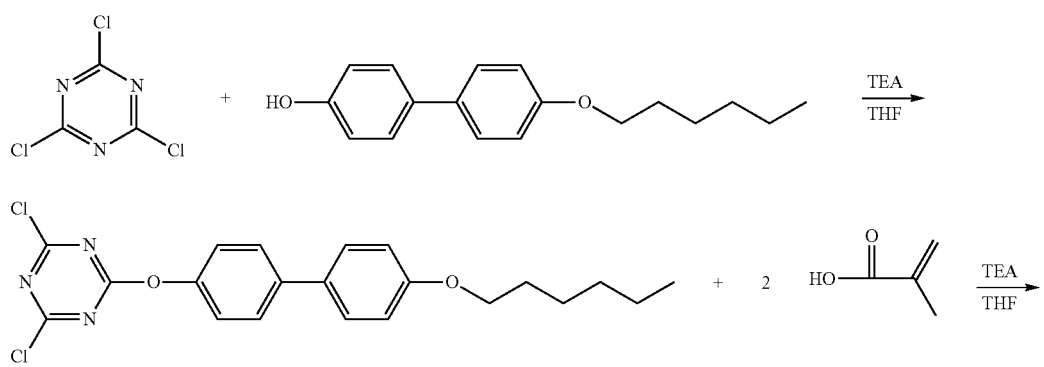

[Reaction 1]

-continued

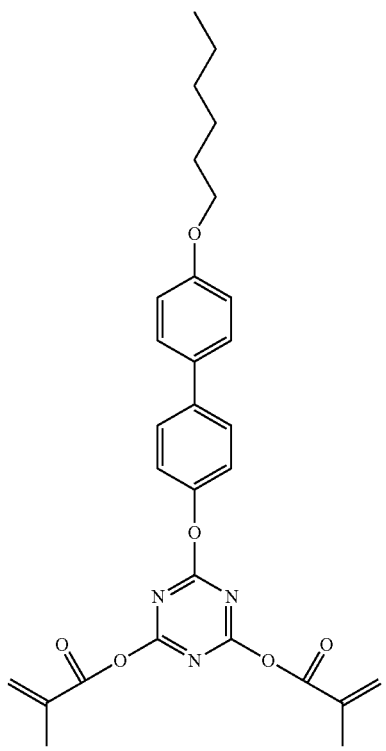

For the synthesis of the reactive monomer represented by Formula 1-1, 100 milliliters (ml) of dried tetrahydrofuran (THF) was added to a well dried two-necked flask. Then, 10 millimole (mmol) of 2,4,6-trichloro-1,3,5-triazine was added to THF, and 10 mmol of 4'-(hexyloxy)[1,1'-biphenyl]-4-ol was added thereto, followed by stirring. While stirring, 30 mmol of triethylamine (TEA) was added, followed by refluxing for 10 hours. While refluxing, 20 mmol of methacrylic acid was added, and 10 mmol of TEA was additionally added, followed by refluxing for an additional 10 hours. By using a filter paper, a salt was removed from the solution, and the residue was separated by column chromatography to produce the final product.

The Example liquid crystal display apparatus is manufactured using a liquid crystal composition including the reactive monomer of Formula 1-1 prepared by Reaction 1. The Comparative Example corresponds to a liquid crystal display apparatus having alignment layers on a first substrate and a second substrate, different from the Example.

In this case, the alignment layer used in the Comparative Example may be formed by coating an alignment solution on a substrate and thermally curing the alignment solution to form an alignment layer. In this case, the alignment layer thus formed may be an alignment layer including a polyimide polymer. In the Example and the Comparative Example, the same kind of liquid crystal molecules were used, and the manufacturing conditions of the display apparatus were the same except for the forming or not forming of the alignment layer.

Figure 7A:
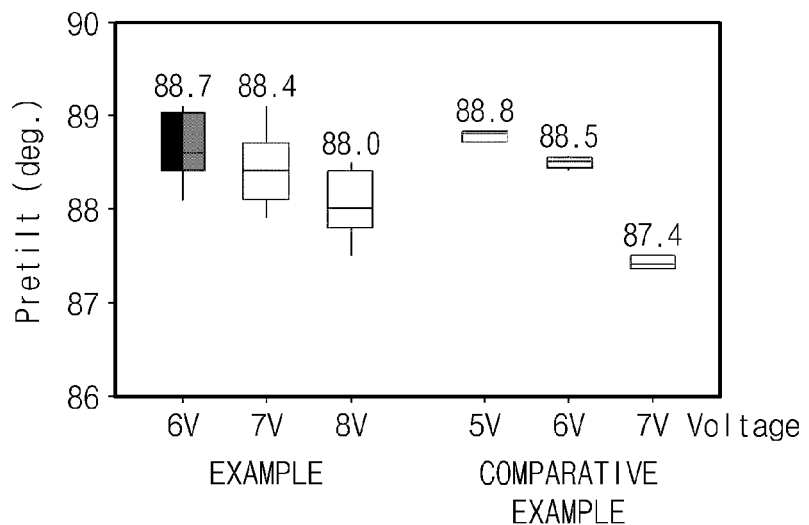
FIG. 7A is graph illustrating the pretilt angle values (°) versus the voltage (V) of an applied electric field in accordance with a Comparative Example and an Example.
Figure 7B:
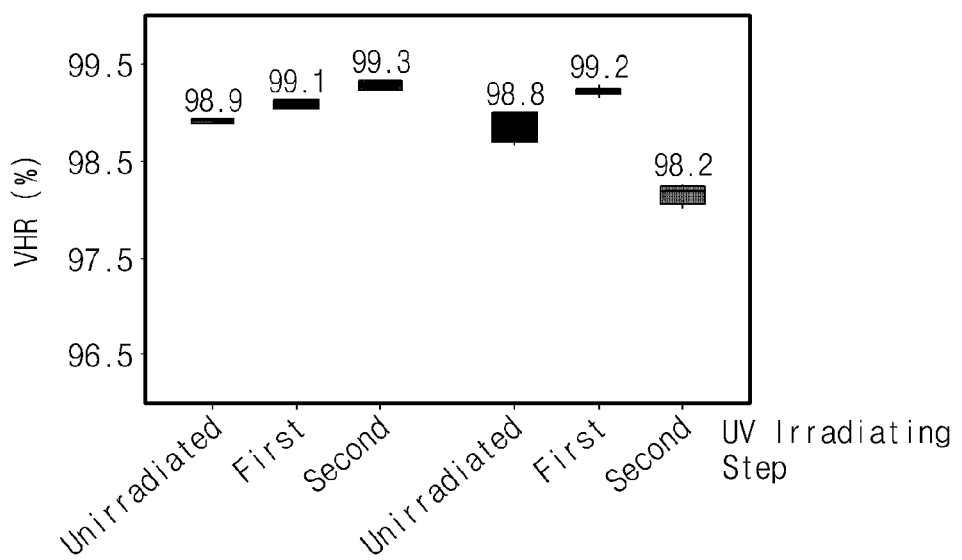
FIG. 7B is graph illustrating the voltage holding ratios (VHR, %) versus the ultraviolet irradiation step in accordance with the Comparative Example and the Example.

FIGS. 7A and 7B are graphs comparing a pretilt angle and a voltage holding ratio (VHR) of liquid crystal display apparatuses manufactured by methods for manufacturing liquid crystal display apparatuses in accordance with the Example and the Comparative Example.

FIG. 7A is a graph illustrating the pretilt angle values of liquid crystal molecules versus the voltage values of an applied electric field. In the Example, liquid crystal molecules were aligned using alignment inducing patterns formed on a substrate without an alignment layer, and the pretilt angle of about 87 degrees to about 89 degrees was obtained. This value is almost the same as that for the Comparative Example in which an alignment layer is formed. Accordingly, it the liquid crystals may be aligned to have a stable pretilt angle by only forming the alignment inducing patterns, that is, without the alignment layer. In particular, the alignment inducing patterns were formed by a thermal polymerization process using the liquid crystal composition including the thermal initiator. According to this exemplary process, one ultraviolet irradiating process step may be omitted, and productivity may be improved when compared to a method for forming alignment inducing patterns by photo polymerization (Comparative Example). In addition, the quality of a display apparatus manufactured by the Example manufacturing method was good since the pretilt values of the liquid crystal molecules is essentially the same as for the Comparative Example.

FIG. 7B is a graph illustrating a voltage holding ratio (VHR, %) versus the ultraviolet radiation step in accordance with the Example and the Comparative Example. The abscissa represents each step of irradiating ultraviolet rays in the manufacturing steps of a liquid crystal display apparatus, and includes no irradiating of ultraviolet rays (unirradiated), irradiating first ultraviolet rays (first), and irradiating first and second ultraviolet rays (second).

Referring to the results of FIG. 7B, stable voltage holding values of about 98% or more were obtained for both the Example and the Comparative Example. In particular, the voltage holding ratio was increased when the step of irradiating ultraviolet rays is added in the Example method. Through the addition of the irradiating process, reactive monomers which remain unreacted following a thermal polymerization process may be additionally polymerized, or the unreacted reactive monomers may be removed, thereby improving the mechanical properties of the alignment inducing patterns.

The liquid crystal composition in an embodiment may include liquid crystal molecules, a thermal initiator, and a reactive monomer capable of being polymerized upon initiation by the thermal initiator, and may form alignment inducing patterns capable of aligning liquid crystal molecules. In particular, in the manufacturing method according to an embodiment, the thermal polymerization process and a seal bake process curing a sealing material may be conducted simultaneously. Accordingly, one step of irradiating ultraviolet rays may be removed when compared to a process of forming alignment inducing patterns using a photo polymerization reaction.

In addition, since the exemplary method of forming the alignment inducing patterns from the reactive monomers does not include forming the alignment layer, the steps of coating of an alignment layer and a curing process may be omitted, and the productivity of a liquid crystal display apparatus may be improved. The liquid crystal molecules may be stably pretilted and aligned by the alignment inducing patterns formed by the method for manufacturing a liquid crystal display apparatus according to an embodiment, and the same or better display quality may be obtained when compared to a prior art liquid crystal display apparatus including an alignment layer.

According to the method for manufacturing a liquid crystal display apparatus according to an embodiment, a liquid crystal composition including a thermal initiator is used, and alignment inducing patterns may be formed by a thermal polymerization method. Accordingly, liquid crystal molecules may have stable pretilt angle using only the alignment inducing patterns formed by the thermal polymerization method without the need for an alignment layer.

Particularly, a curing process of a sealing material provided for combining upper and lower substrates of a liquid crystal display apparatus, and a forming process of alignment inducing patterns may be conducted simultaneously, and the productivity of the manufacturing process of the liquid crystal display apparatus may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method for manufacturing a liquid crystal display apparatus, the method comprising:
providing a liquid crystal composition between a first substrate and a second substrate facing the first substrate, the liquid crystal composition comprising liquid crystal molecules, a thermal initiator, and a reactive monomer;
applying heat to the liquid crystal composition to form an alignment inducing pattern on the first substrate and on the second substrate;
forming an electric field between the first substrate and the second substrate; and
providing first ultraviolet rays to the liquid crystal composition.

2. The method for manufacturing the liquid crystal display apparatus of claim 1, wherein the forming of the electric field and the providing of the first ultraviolet rays are conducted during a same process.

3. The method for manufacturing the liquid crystal display apparatus of claim 1, further comprising providing a sealing layer between the first substrate and the second substrate and applying heat to the sealing layer.

4. The method for manufacturing the liquid crystal display apparatus of claim 3, wherein the applying of the heat to the liquid crystal composition and the applying of the heat to the sealing layer are conducted during a same process.

5. The method for manufacturing the liquid crystal display apparatus of claim 2, further comprising providing second ultraviolet rays to the liquid crystal composition after providing the first ultraviolet rays.

6. The method for manufacturing the liquid crystal display apparatus of claim 5, wherein the first ultraviolet rays and the second ultraviolet rays have a wavelength in a same region.

7. The method for manufacturing the liquid crystal display apparatus of claim 1, wherein the thermal initiator is at least one of an azo compound, a peroxy ester compound, a peroxy dicarbonate compound, an acyl peroxide compound, or a redox initiator.

8. The method for manufacturing the liquid crystal display apparatus of claim 1, wherein the thermal initiator is at least one of tert-amyl peroxybenzoate, 4,4'-azobis(4-cyanopentanoic acid), 1,1'-azobis(cyanocyclohexane), azobisisobutyronitrile, 2,2-bis(tert-butylperoxy)butane, 1,1-bis(tert-butylperoxy)cyclohexane, benzoyl peroxide, 2,5-bis(tert-butylperoxy)-2,5-dimethylhexane, bis[1-(tert-butylperoxy)-1-methylethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, or potassium peroxodisulfate.

9. The method for manufacturing the liquid crystal display apparatus of claim 1, wherein the reactive monomer comprises a polymerization reaction group which polymerizes upon initiation by the thermal initiator, and a vertical alignment inducing group which aligns the liquid crystal molecules.

10. The method for manufacturing the liquid crystal display apparatus of claim 9, wherein the polymerization reaction group is at least one of

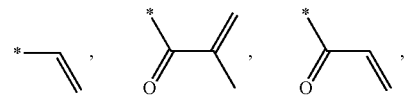

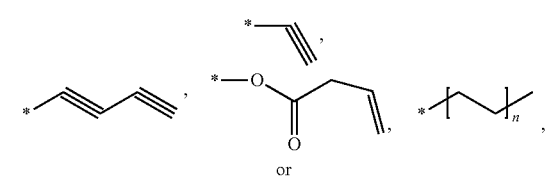

or

11. The method for manufacturing the liquid crystal display apparatus of claim 1, wherein the reactive monomer comprises at least one of an acrylate compound, a methacrylate compound, an epoxy compound, an oxetane compound, a vinyl-ether compound, or a styrene compound.

12. The method for manufacturing the liquid crystal display apparatus of claim 1, wherein the alignment inducing pattern has a bump shape extruded on the first substrate or on the second substrate.

13. A liquid crystal composition comprising liquid crystal molecules, a thermal initiator, and a reactive monomer having a polymerization reaction group capable of being polymerized upon initiation by the thermal initiator.

14. The liquid crystal composition of claim 13, wherein the reactive monomer is present in an amount of about 1.0 part by weight to about 1.5 parts by weight per 100 parts by weight of the liquid crystal molecules.

15. The liquid crystal composition of claim 14, wherein the thermal initiator is present in an amount of about 1.0 part by weight to about 3.0 parts by weight per 100 parts by weight of the reactive monomer.

16. The liquid crystal composition of claim 13, wherein the thermal initiator is at least one of tert-amyl peroxybenzoate, 4,4'-azobis(4-cyanopentanoic acid), 1,1'-azobis(cyanocyclohexane), azobisisobutyronitrile, 2,2-bis(tert-butylperoxy)butane, 1,1-bis(tert-butylperoxy)cyclohexane, benzoyl peroxide, 2,5-bis(tert-butylperoxy)-2,5-dimethylhexane, bis[1-(tert-butylperoxy)-1-methylethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, or potassium peroxodisulfate.

17. The liquid crystal composition of claim 13, wherein the reactive monomer is a compound represented by following Formula 1:

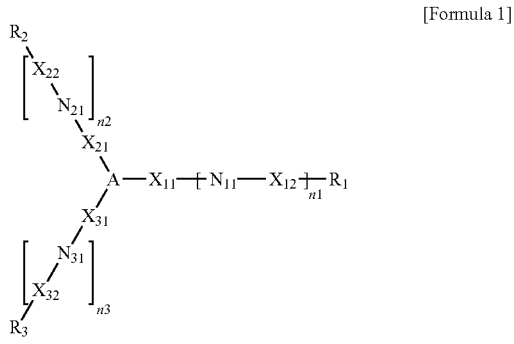

[Formula 1]

wherein A is a group in Formula 1a:

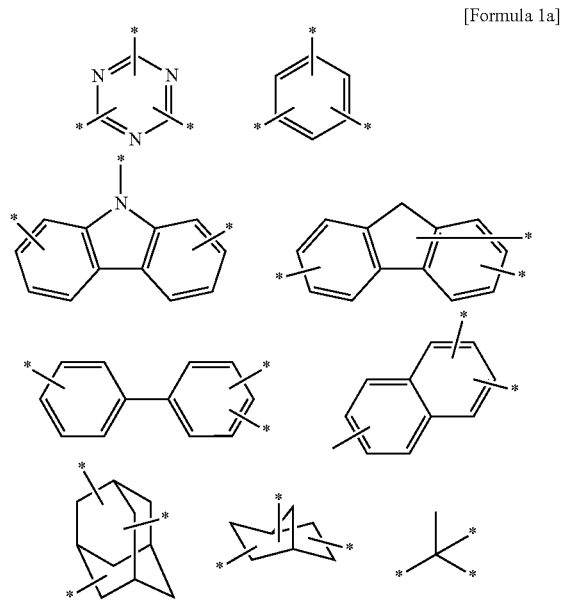

[Formula 1a]

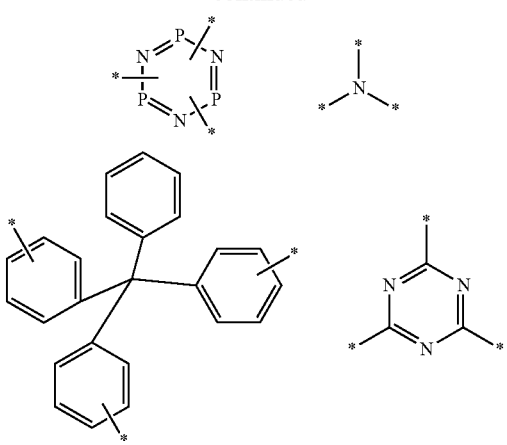

$X_{11}$, $X_{12}$, $X_{22}$, and $X_{32}$ are each independently a direct bond, —O—, —C(O)O—, or —NH—, $N_{11}$, $N_{21}$, and $N_{31}$ are each independently a group in Formula 1b:

[Formula 1b]

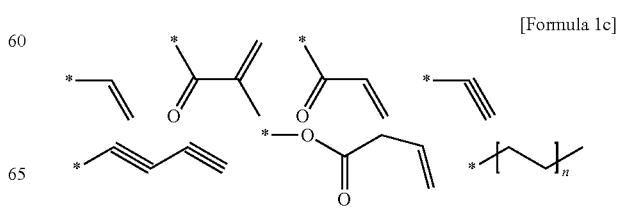

$R_1$ to $R_3$ are each independently a group in Formula 1c:

[Formula 1c]

-continued

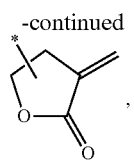

and
n1 to n3 are each independently 0 or 1.

18. The liquid crystal composition of claim 13, wherein the reactive monomer is a triazole compound represented by Formula 2:

[Formula 2]

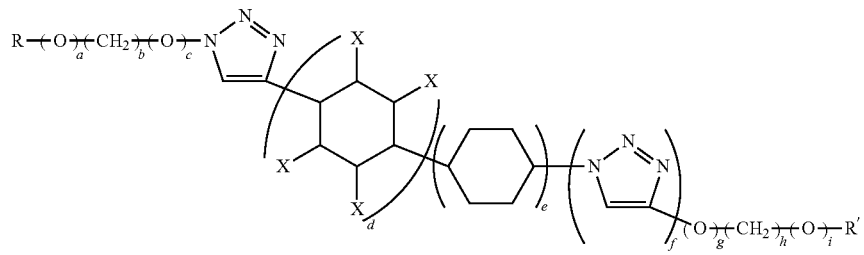

wherein b and h are each independently an integer from 1 to 20, a, c, e, f, g, and i are each independently an integer of 0 or 1, and d is an integer from 1 to 3,
each X is independently H, —CH$_3$, —(CH$_2$)$_m$CH$_3$ (where m is an integer from 1 to 20), F, Br, I, —OH, —C$_3$H$_7$, —NH$_2$, or —CN, and
R and R$^r$ are each independently a group in Formula 2a:

[Formula 2a]

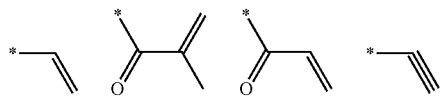

-continued

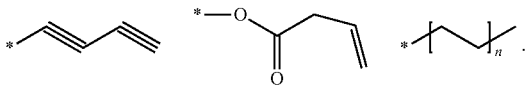

19. The liquid crystal composition of claim 13, wherein the reactive monomer is a compound in Formula 3:

[Formula 3]

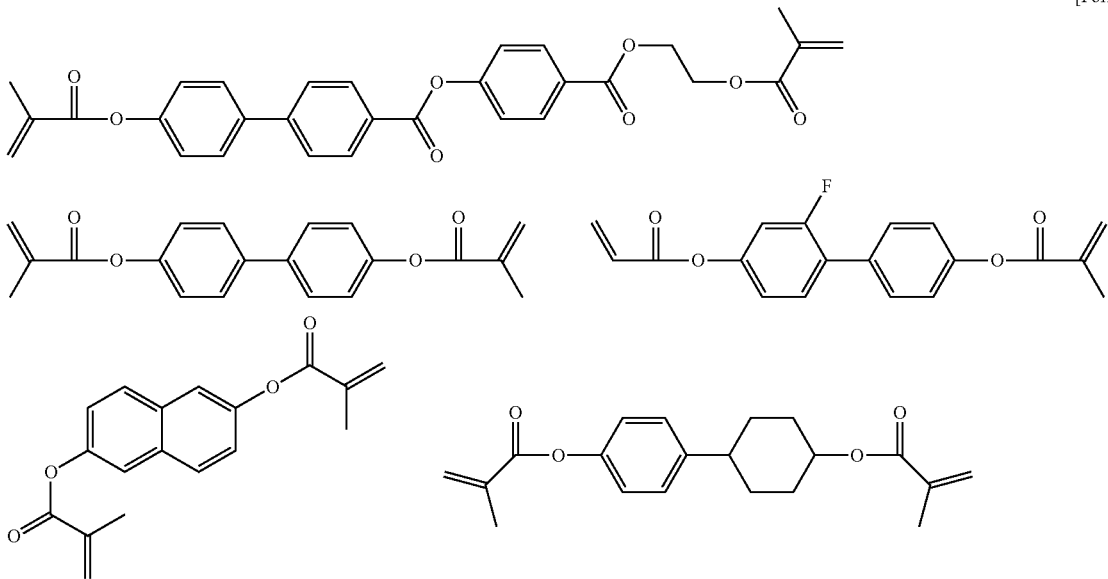

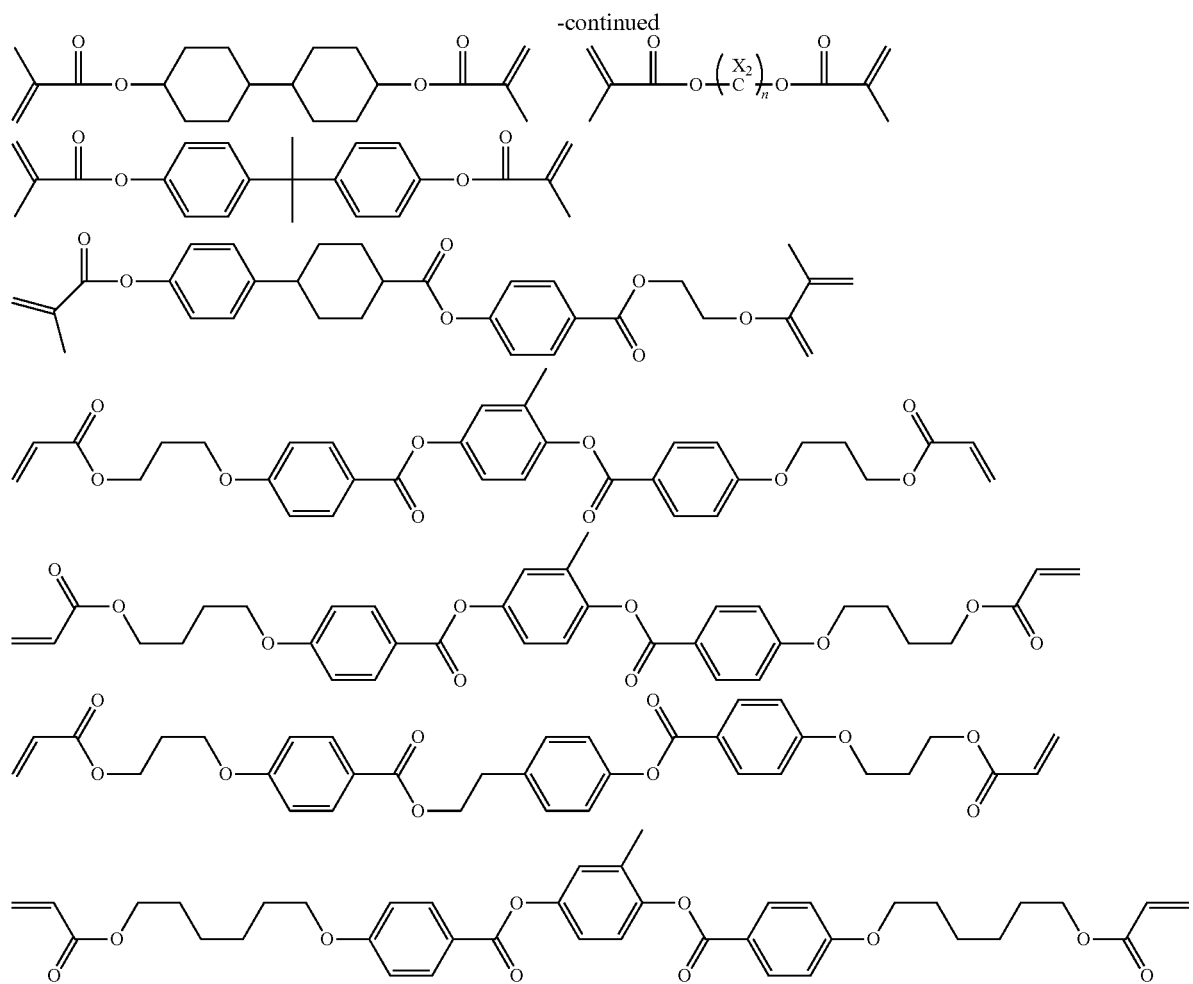
wherein X is H, —CH₃, —(CH)₂CH₃, F, Br, I, —OH, —C₃H₇, —NH₂, or —CN, and n is an integer from 1 to 20.
20. The liquid crystal composition of claim 17, wherein the reactive monomer further comprises a compound represented by Formula 4:
R₅—B—VA  [Formula 4]
wherein VA is a group in Formula 4a:
[Formula 4a]
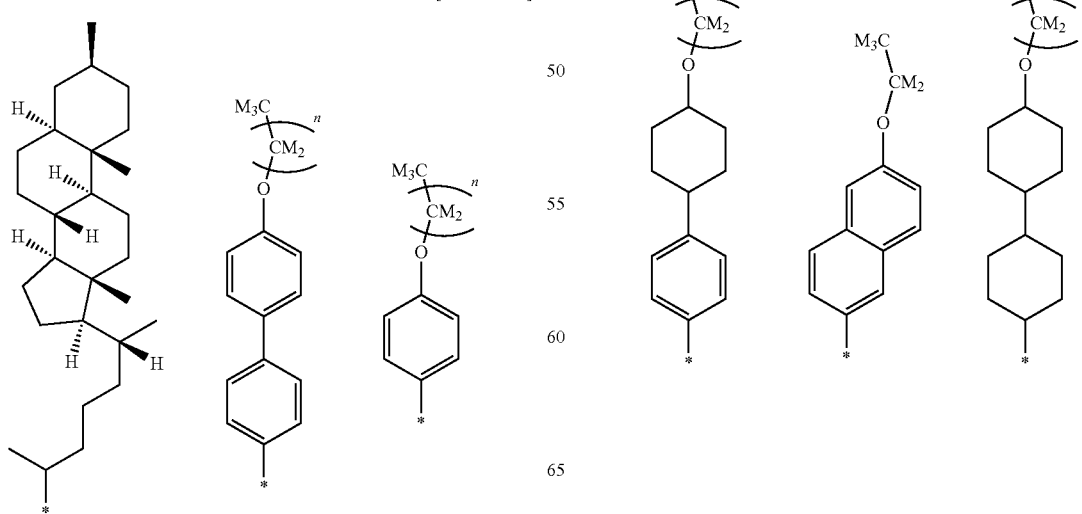

-continued
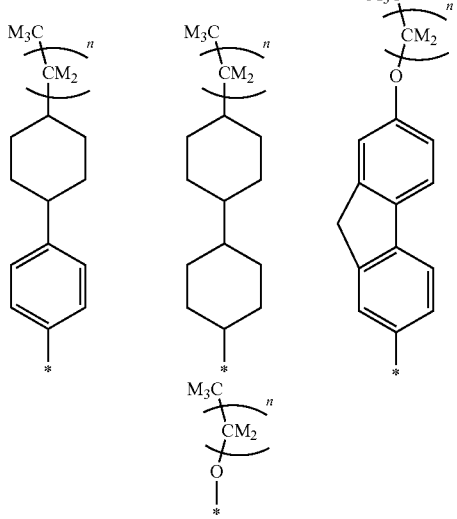
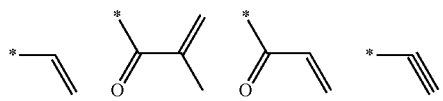
wherein each M is independently H, —CH$_3$, —(CH$_2$)$_n$CH$_3$, F, Br, I, OH, —C$_3$C$_7$, —NH$_2$, or —CN, and each n is independently an integer from 1 to 20,
R$_5$ is a group in Formula 4b:
[Formula 4b]
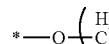
-continued
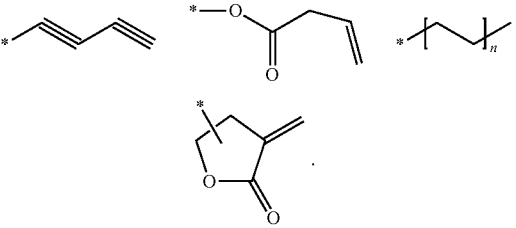
B is of a group in Formula 4c:
[Formula 4c]
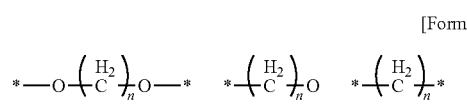
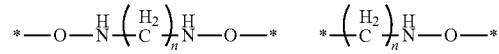
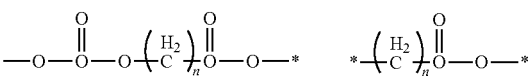
wherein each n is independently an integer from 1 to 20.
* * * * *